US009089988B2

(12) United States Patent
Tokura

(10) Patent No.: US 9,089,988 B2
(45) Date of Patent: Jul. 28, 2015

(54) APPARATUS WITH A CARTRIDGE HOLDER TO RECEIVE A PEN OR A CUTTER FOR CUTTING OR DRAWING IMAGE

(71) Applicant: Masashi Tokura, Konan (JP)

(72) Inventor: Masashi Tokura, Konan (JP)

(73) Assignee: BROTHER KOGYO KABUSHIKI KAISHA, Nagoya-shi (JP)

( * ) Notice: Subject to any disclaimer, the term of this patent is extended or adjusted under 35 U.S.C. 154(b) by 0 days.

(21) Appl. No.: 14/211,888

(22) Filed: Mar. 14, 2014

(65) Prior Publication Data

US 2014/0260854 A1 Sep. 18, 2014

(30) Foreign Application Priority Data

Mar. 14, 2013 (JP) ................................ 2013-051698

(51) Int. Cl.

| | |
|---|---|
| ***G06K 15/00*** | (2006.01) |
| ***B26F 1/38*** | (2006.01) |
| ***B26D 5/00*** | (2006.01) |
| ***B26D 5/02*** | (2006.01) |
| *B26D 7/01* | (2006.01) |
| *B26D 7/26* | (2006.01) |

(52) U.S. Cl.

CPC .............. *B26F 1/3813* (2013.01); *B26D 5/007* (2013.01); *B26D 5/02* (2013.01); *B26D 7/015* (2013.01); *B26D 2007/2678* (2013.01); *Y10T 83/162* (2015.04); *Y10T 83/849* (2015.04)

(58) Field of Classification Search

CPC ..... H04N 7/173; H04N 21/8456; H04N 5/76; H04N 7/17318; H04N 21/23418; H04N 21/26603; H04N 21/4312; H04N 21/4314; H04N 21/4334; H04N 21/440281; H04N 21/4622; H04N 21/4782; H04N 21/6125; H04N 21/84; G06F 17/241

USPC ........................................ 358/1.18, 1.13, 1.1

See application file for complete search history.

(56) References Cited

U.S. PATENT DOCUMENTS

| | | | | |
|---|---|---|---|---|
| 2003/0053140 | A1 | 3/2003 | Kakutani | |
| 2005/0186010 | A1 * | 8/2005 | Shibata et al. | 400/621 |

FOREIGN PATENT DOCUMENTS

| | | | |
|---|---|---|---|
| JP | S61-165187 | A | 7/1986 |
| JP | 2003-101732 | A | 4/2003 |
| JP | 2005-230917 | A | 9/2005 |
| JP | 2006-005455 | A | 1/2006 |

* cited by examiner

*Primary Examiner* — Martin Mushambo

(74) *Attorney, Agent, or Firm* — Fox Rothschild LLP

(57) ABSTRACT

An apparatus includes a cartridge holder configured to receive a pen or a cutter, a platen configured to receive an object, a moving mechanism configured to move the cartridge holder in a direction that the cartridge holder comes close to the platen, a read unit configured to read image data from the object, and a processor configured to instruct the apparatus to set a specific size of a pattern in the image data, eliminate, from the image data, one or more of specific patterns whose size is less or equal to the specific size, and instruct the moving mechanism to move the cartridge holder close to the platen, based on the image data after eliminating one or more of specific patterns from the read image data.

17 Claims, 12 Drawing Sheets

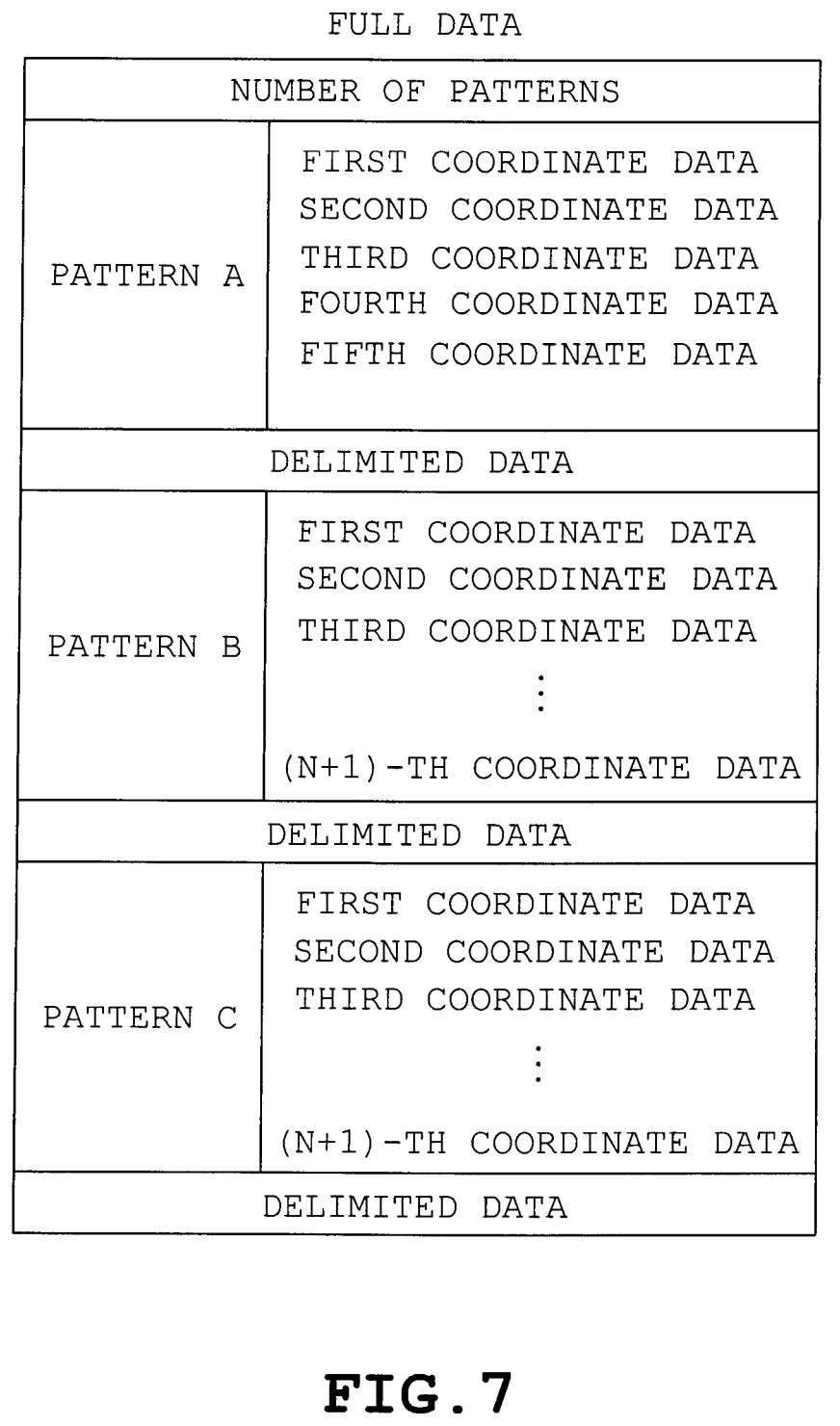

FULL DATA

| NUMBER OF PATTERNS | |
|---|---|
| PATTERN A | FIRST COORDINATE DATA<br>SECOND COORDINATE DATA<br>THIRD COORDINATE DATA<br>FOURTH COORDINATE DATA<br>FIFTH COORDINATE DATA |
| DELIMITED DATA | |
| PATTERN B | FIRST COORDINATE DATA<br>SECOND COORDINATE DATA<br>THIRD COORDINATE DATA<br>⋮<br>(N+1)-TH COORDINATE DATA |
| DELIMITED DATA | |
| PATTERN C | FIRST COORDINATE DATA<br>SECOND COORDINATE DATA<br>THIRD COORDINATE DATA<br>⋮<br>(N+1)-TH COORDINATE DATA |
| DELIMITED DATA | |

FIG. 7

APPARATUS WITH A CARTRIDGE HOLDER TO RECEIVE A PEN OR A CUTTER FOR CUTTING OR DRAWING IMAGE

CROSS-REFERENCE TO BELATED APPLICATIONS

This application is based upon and claims the benefit or priority from the prior Japanese Patent Application No. 2013-051698 filed on Mar. 14, 2013, the entire contents of which are incorporated herein by reference.

BACKGROUND

1. Technical Field

The present disclosure relates to an apparatus provided with a cartridge holder receiving a pen or a cutter and a non-transitory computer-readable medium storing data of instructions for the apparatus.

2. Related Art

Cutting plotters have been conventionally known as an apparatus automatically executing a cutting process. An object to be cut is a sheet-shaped object (paper sheet, for example). The sheet is held on a base material. More specifically, the base material is a holding member having an adhesive layer on a surface thereof. The sheet is applied to the adhesive layer. The cutting plotter moves the base material holding the sheet, in a first direction while holding both ends of the base material vertically between a driving roller and a pinch roller. The cutting plotter further moves a carriage with a cutting blade in a second direction perpendicular to the first direction. A desired pattern is cut out of the sheet by the above-described operation.

The cutting plotter has been proposed to be equipped with an image acquisition apparatus provided with a scanner. In this case, a sheet printed with a pattern is set on the cutting plotter. An image of the sheet surface is then read by the scanner, so that cutting data of the pattern can be generated on the basis of the image data. The cutting plotter then executes a cutting process based on the generated cutting data, with the result that a pattern which is the same as printed on the sheet can be cut out of the sheet.

SUMMARY

There is sometimes a case where noise is on the data of image read by the scanner. The noise is a black dot resulting from dust, trash or the like. In view of this defect, image editing of noise reduction is generally executed automatically in the image acquisition apparatus such as copy machines and printers.

However, a pattern printed on the sheet to be processed by the cutting plotter is sometimes a minute pattern. In this case, it is difficult to automatically determine whether or not the pattern is a black dot. Furthermore, a mark as a guide for the sheet, that is, a register mark is printed on the base material. Accordingly, the register mark is also read by the scanner as well as the image on the sheet surface. Since the register mark is obviously larger than the black dot, the register mark is also formed into cutting data without being eliminated as noise.

Thus, if is assumed that processed data is generated without appropriate execution of noise elimination of image data. In this case, there is a possibility that processing may be applied to a part which normally requires no processing and that a whole sheet may be wasted.

Therefore, an object of the disclosure is to provide an apparatus which can apply appropriate processing based on an object image and a non-transitory computer-readable medium storing data of instructions for the apparatus.

The present disclosure provides an apparatus including a cartridge holder configured to receive a pen or a cutter, a platen configured to receive an object, a moving mechanism configured to move the cartridge holder in a direction that the cartridge holder comes close to the platen, a read unit configured to read image data from the object, and a processor configured to instruct the apparatus to set a specific size of a pattern in the image data, eliminate, from the image data, one or more of specific patterns whose size is less or equal to the specific size, and instruct the moving mechanism to move the cartridge holder close to the platen, based on the image data after eliminating one or more of specific patterns from the read image data.

The disclosure further provides a non-transitory computer-readable medium for an apparatus comprising a cartridge holder configured to receive a pen or a cutter, a platen configured to receive an object, a moving mechanism configured to move the cartridge holder in a direction that the cartridge holder comes close at least to the platen, a read unit configured to read image data from the object, wherein the computer-readable medium storing computer-readable instructions, when executed by a processor of the apparatus, cause the apparatus to set a specific size of a pattern in the image data, eliminate, from the image data, one or more of specific patterns whose size is less or equal to the specific size, and instruct the moving mechanism to move the cartridge holder close to the platen, based on the image data after eliminating one or more of specific patterns from the read image data.

The disclosure still further provides an apparatus including a pen or a cutter, a platen receiving an object, a moving mechanism configured to move the pen or the cutter in a direction that the cartridge holder comes close at least to the platen, a read unit configured to read image data from the object, and a processor configured to instruct the apparatus to set a specific size of a pattern in the image data, eliminate, from the image data, one or more of specific patterns whose size is less or equal to the specific size, and instruct the moving mechanism to move the cartridge holder close to the platen, based on the image data after eliminating one or more of specific patterns from the read image data.

BRIEF DESCRIPTION OF THE DRAWINGS

In the accompanying drawings:

FIG. 7 illustrates an example of a structure of processing data;

DETAILED DESCRIPTION

Figure 1:
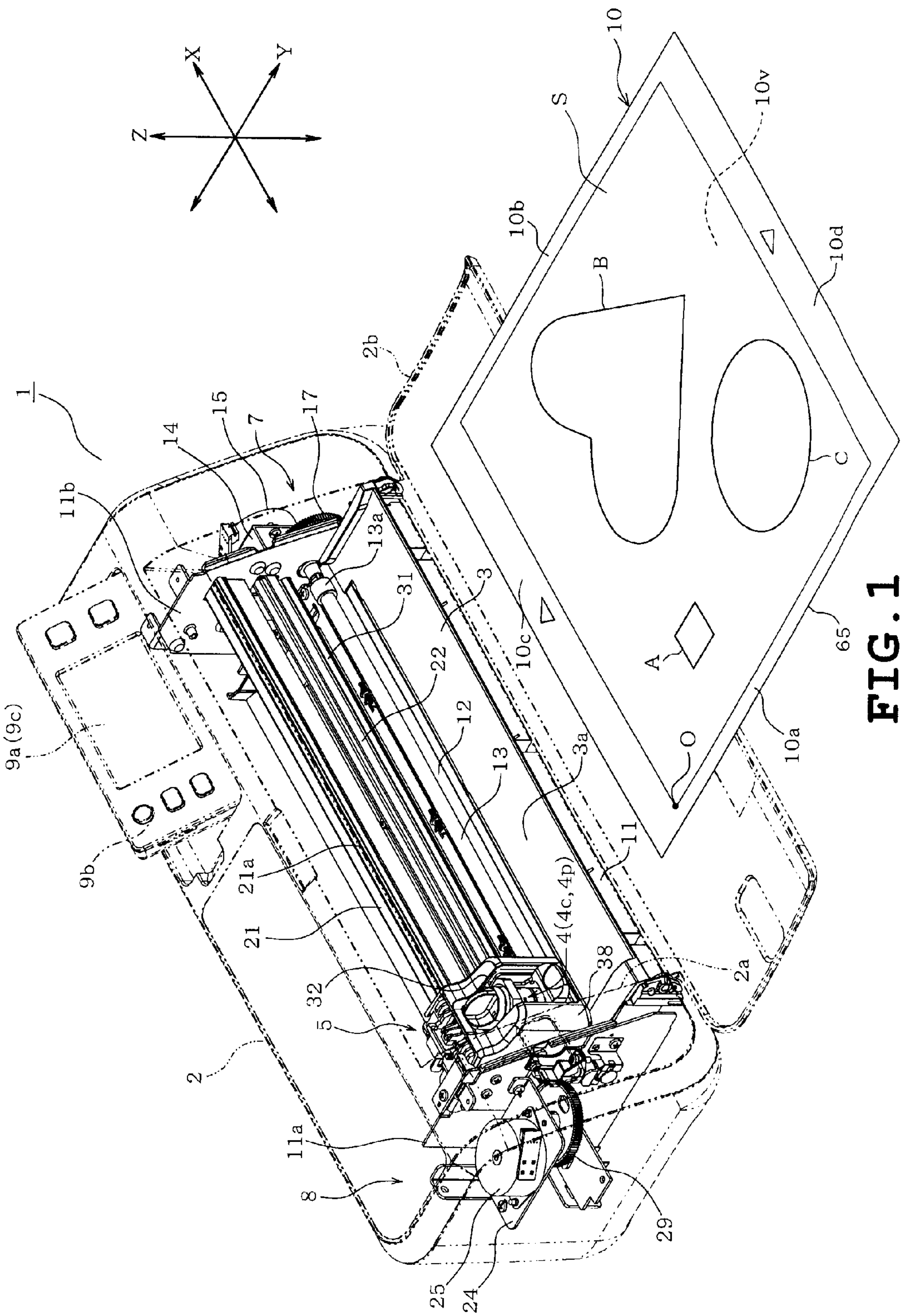
FIG. 1 is an example of a perspective view of a processing apparatus, showing an inner structure thereof and a body cover.

One example of an apparatus will be described with reference to the accompanying drawings. Referring to FIG. 1, a processing apparatus 1 is shown and includes a body cover 2 serving as a housing, a platen 3 provided in the body cover 2 and a processing head 5 on which a cartridge 4 is to be mounted. The processing apparatus 1 further includes a scanner 6 (see FIGS. 2 and 6) serving as an image obtaining unit.

In the processing apparatus 1, a plurality of cutter cartridges 4*c* and a plurality of pen cartridges 4*p* are prepared as the cartridge 4. One of the cartridges 4*c* and 4*p* is selectively attached to a cartridge holder 32 of a processing head 5 as will be described later. All the cartridges 4*c* and 4*p* include respective cases having substantially the same shape (see cases 50 in FIGS. 4A and 4B). All the cartridges 4*c* and 4*p* will be hereinafter referred to as "cartridge 4" for the sake of simplicity.

Figure 10:
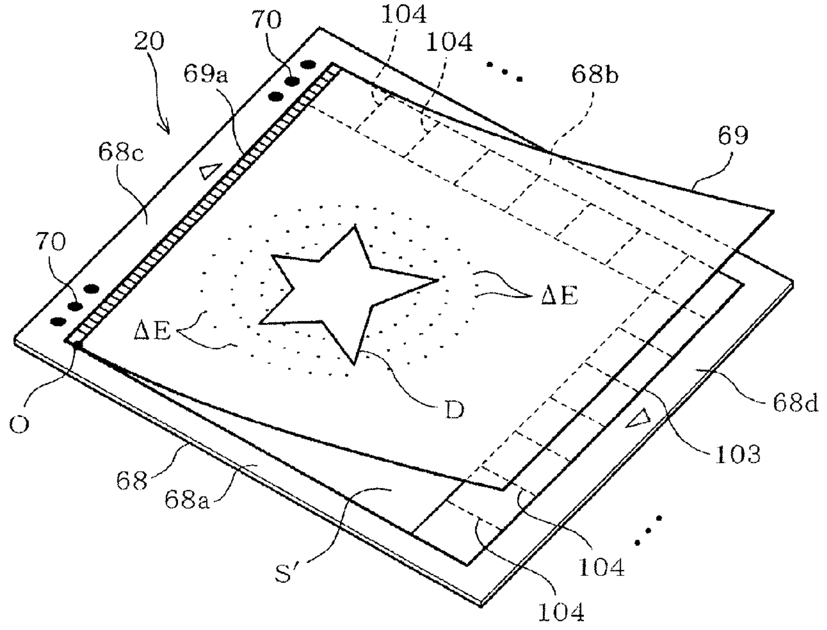
FIG. 10 is an example of a perspective view of a read holding member.

The processing apparatus 1 also includes a holding Member to hold an object S to be processed or read. The holding member 10 has an upper surface including peripheral edges 10*a* to 10*d* and an inner region to which an adhesive agent is applied thereby to be formed into an adhesive layer 10*v*, as will be described in detail later. The user affixes the object S to the adhesive layer 10*v* with the result that the object S is held by the holding member 10. A read holding member 10 as shown in FIG. 10 is also used as well as the holding member 10 as shown in FIG. 1 and will also be described in detail later.

The body cover 2 is formed into the shape of a horizontally long rectangular box. The body cover 2 has a front formed with an opening 2*a*. A front cover 2*b* is mounted on the front of the body cover 2 to open and close the opening 2*a* . The holding member 10 holding the object S is set onto the platen 3 while the opening 2*a* is open. The cartridge 4 is also attached to and detached from a cartridge holder 32 while the opening 2*a* is open.

The processing apparatus 1 includes a transfer mechanism 7 which transfers the holding member 10 set on the platen 3 in a predetermined transfer direction. The processing apparatus 1 also includes a head moving mechanism 8 which moves a processing head 5 in a direction intersecting with the transfer direction of the holding member 10 (for example, a direction perpendicular to the transfer direction). In the following description, the direction in which the holding member 10' is transferred by the transfer mechanism 7 will be referred to as "front-rear direction". That is, the side of the opening 2*a* of the processing apparatus 1 will be referred to as "front" and the opposite side will be referred to as "rear."

A display 9*a* and an operation switch device 9*b* including various operation switches are mounted on a right upper surface of the body cover 2. The display 9*a* is comprised of a full-color liquid display device and configured as a display unit which displays various patterns, images obtained by the scanner 6, necessary messages to the user, and the like. The operation device 9*b* is operated by the user when various input contents are entered. A touch panel 9*c* is placed on a display surface side of the display 9*a*. When operating the operation switches of the operation switch device 9*b* or the touch panel 9*c*, the user can designate an object to be displayed on a screen of the display 9*a*, select various patterns, switch various operation modes and set various parameters.

Figure 2:
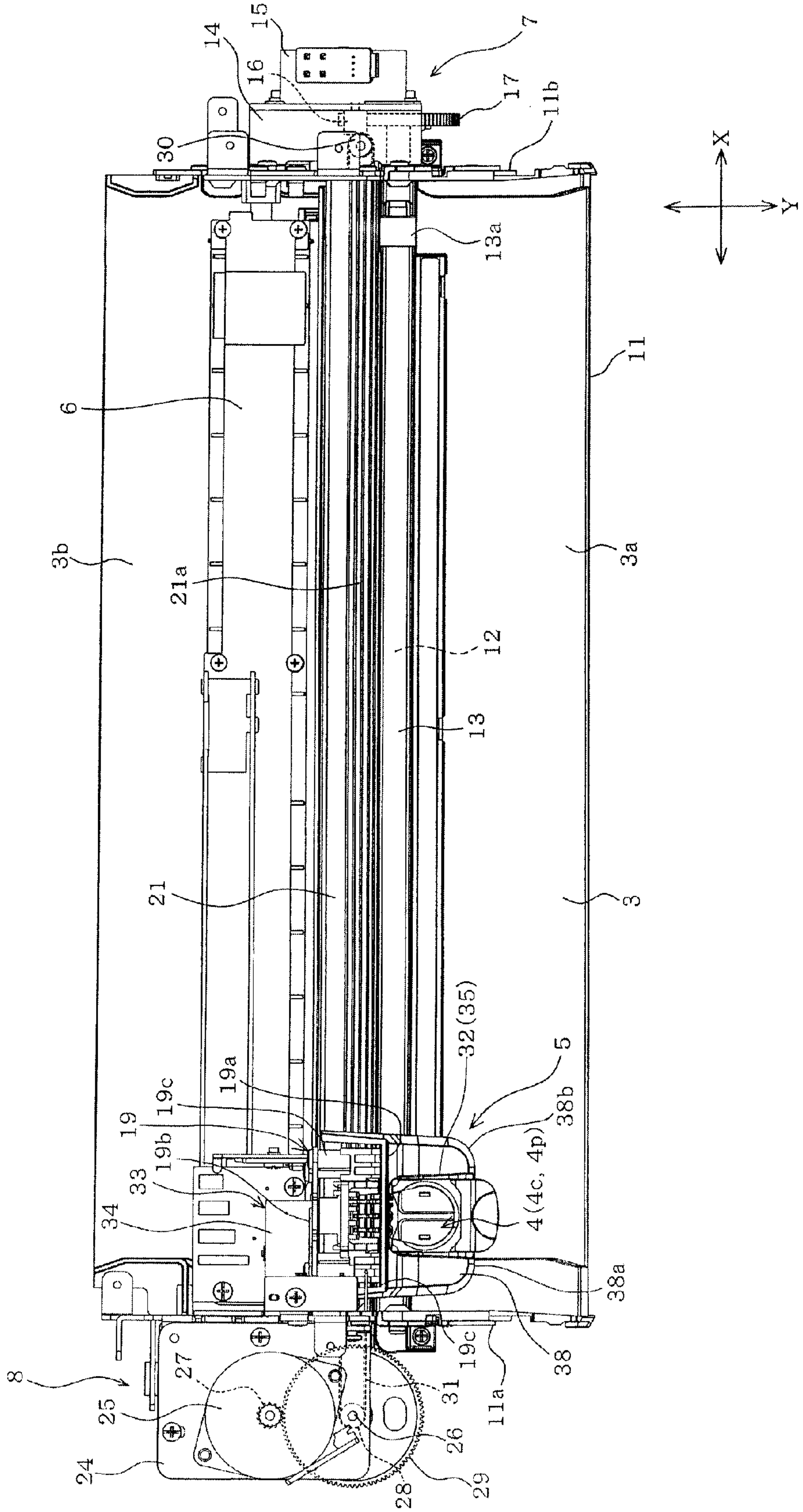
FIG. 2 is an example of a plan view of the processing apparatus, showing the inner structure thereof.

The platen 3 receives the underside of the holding member 10 when the object S is processed. The platen 3 includes a front platen 3*a* and a rear platen 3*b* and has a horizontal upper surface as shown in FIG. 2. The holding member 10 holding the object S is transferred with while being placed on the platen 3.

The transfer mechanism 7 and the had moving mechanism 8 are constructed into a relative movement unit which moves the holding member 10 holding the object S in the X direction and the processing head 5 in the Y direction relative to each other. Firstly, the transfer mechanism 7 transfers the holding member 10 on the upper surface side of the platen 3 freely in the Y direction, A frame 11 is enclosed in the body cover 2 as shown in FIGS. 1 and 2. The frame 11 includes right and left sidewalls 11*b* and 11*a* which are located at right and left sides of the platen 3 so as to face each other, respectively. A driving roller 12 and a pinch roller 13 are mounted on both sidewalls 11*a* and 11*b* so as to be located in a space between the front and rear platens 3*a* and 3*b*. The driving roller 12 and the pinch roller 13 extend in the right-left direction and lined in the up-down direction. The pinch roller 13 is located above the driving roller 12.

The driving roller 12 has an upper end which is substantially level with the upper surface of the platen 3 and right and left ends mounted on the right and left sidewalls 11*b* and 11*a* respectively so that the driving roller 12 is rotatable. The right end of the driving roller 12 extends rightward through the right sidewall 11*b* as shown in FIG. 2. A driven gear 17 having a large diameter is secured to a right distal end of the driving roller 12. A mounting frame 14 is fixed, to an outer surface of the right sidewall 11*b*. A Y-axis motor 15 comprised of a stepping motor, for example is mounted on the mounting frame 14. The Y-axis motor 15 has an output shaft to which is fixed a driving gear 16 which has a small diameter and is to be brought into mesh engagement with the driven gear 17.

The pinch roller 13 has right and left ends mounted on the right and left sidewalls 11*b* and 11*a* respectively so that the pinch roller 13 is rotatable and slightly displaceable in the up-down direction. Two springs (not shown) are mounted on the outer surfaces of the right and left sidewalls 11*b* and 11*a* to normally bias the pinch roller 13 downward. Accordingly, the pinch roller 13 is normally biased downward (to the driving roller 12 side) by the springs. Two rollers 13*a* having a slightly large diameter are mounted on the pinch roller 13 so as to be located near both ends thereof respectively. Only the right roller 13*a* is shown in FIGS. 1 and 2.

The right and left ends 10*b* and 10*a* of the holding member 10 are thus held between the driving roller 12 and the rollers 13*a* of the pinch roller 13. Upon drive of the Y-axis motor 15, normal or reverse rotation of the Y-axis motor 15 is transmitted via the gears 16 and 17 to the driving roller 12, whereby the holding member 10 is transferred rearward or forward together with the object S. The transfer mechanism 7 is thus constituted by the driving roller 12, the pinch roller 13, the Y-axis motor 15 and the gears 16 and 17 serving as a reduction mechanism.

The carriage moving mechanism 3 serves to move the carriage 19 of the processing head 5 freely in the X direction. More specifically, as shown in FIGS. 1 and 2, a pair of guide rails 21 and 22 are fixed to the right and left sidewalls 11*b* and 11*a* so as to be located slightly rear above the pinch roller 13. The guide rails 21 and 22 extend in the right-left direction substantially in parallel to the pinch roller 13. Guide grooves are formed in an upper surface of the guide rail 21 and an underside of the guide rail 22 so as to extend between the right and left ends although only the guide groove 21*a* of the upper surface is shown.

Furthermore, the carriage 19 has a pair of protrusions engaging the guide grooves 21*a* and 21*b* respectively although the grooves are not shown. The protrusions are formed on the upper and lower sides so as to hold the guide grooves 21*a* therebetween in the up-down direction. Thus, the carriage 19 is supported by the engagement of the protrusions and the guide grooves 21*a* so as to be slidable on the guide rails 21 and 22 in the right-left direction.

A horizontal mounting frame 24 is fixed to the outer surface of the left sidewall 11*a* so as to be located near the rear of the left sidewall 11*a* at the outer surface side, as shown in FIGS. 1 and 2. An X-axis motor 25 is mounted on a rear part of the left mounting frame 24 to a downward direction. Furthermore, a vertically extending pulley shaft 26 (see FIG. 2) is mounted on the mounting frame 24. The X-axis motor 25 is comprised of a stepping motor, for example and has an output shaft to which a driving gear 27 having a small diameter is fixed. A timing pulley 28 and a driven gear 29 having a large diameter are rotatably mounted on the pulley shaft 26. The timing pulley 28 and the driven gear 29 are configured to be rotated together.

On the other hand, a timing pulley 30 is mounted on the right mounting frame 14 so as to be rotatable about an axis extending in the up-down direction. An endless timing belt 31 horizontally extends between the timing pulleys 30 and 28 in the right-left direction. The timing belt 31 has a midway part joined to a mounting part (not shown) of the processing head 5.

Upon drive of the X-axis motor 25, normal or reverse rotation of the X-axis motor 25 is transmitted via the gears 27 and 29 and the timing pulley 28 to the timing belt 31, whereby the processing head 5 is moved leftward or rightward together with the carriage 19. Thus, the carriage 19 is moved freely in the right-left direction perpendicular to the direction in which the object S is conveyed. The head moving mechanism 8 is thus constituted by the guide rails 21 and 22, the X-axis motor 25, the gears 27 and 29 serving as a reduction mechanism, the timing pulleys 28 and 30, the timing belt 31 and the like.

The processing head 5 includes an up-down drive mechanism 33 and a cartridge holder 32 disposed in the rear and in front of the carriage 19 as shown in FIG. 2. The op-down drive mechanism 33 is configured to drive the cartridge holder 32 in the up-down direction (the Z direction) together with the cartridge 4. The carriage 19 includes front and rear walls 19*a* and 19*b* and upper and lower arms 19*c* and 19*d* connecting the walls 19*a* and 19*b*. Thus, the carriage 19 is shaped so as to surround the front and rear sides and upper and lower sides of the guide rails 21 and 22. A Z-axis motor 34 (see FIG. 2) is mounted so that an axis thereof is directed downward. The Z-axis motor 34 is comprised of a stepping motor, for example. A transmission mechanism (not shown) is provided between the Z-axis motor 34 and the cartridge holder 32. The transmission mechanism reduces a rotational speed of the Z-axis motor 34 and converts rotation of the Z-axis motor 34 to up-down movement of the cartridge holder 32, transmitting the up-down movement. The transmitting mechanism and. the Z-axis motor 34 constitute an up-down drive mechanism 33.

Upon drive of the Z-axis motor 34, normal or reverse rotation of the Z-axis motor 34 is converted via the transmission mechanism to the up-down movement, whereby the cartridge holder 32 is moved, upward or downward together with the cartridge 4. As a result, the cartridge holder 32 is moved together with the cartridge 4 between a lowered position and a raised position. When located at the lowered position, the cartridge 4 of the cartridge holder 32 carries out cutting by a cutter 44 or printing by a pen 45 as shown in FIGS. 4A and 4B. When the cartridge 4 of the cartridge holder 32 is located at the raised position, the blade edge 46 or the pen tip 43 is spaced away from the object S by a predetermined distance (see two-dot chain line in FIG. 3).

When the cartridge 4*c* of the cutter 44 is attached to the cartridge holder 32 and is located at the lowered position, the blade edge 46 penetrates the object S. Pressure of the blade edge 46 for the cutting in this case will be referred to as "cutter pressure." On the other hand, when the cartridge 4*p* of the pen 45 is attached to the cartridge holder 32 and is located, at the lowered position, the pen tip 48 abuts on the object S. Pressure of the pen tip 48 for the cutting in this case will be referred to as "pen pressure." The cutter pressure and the pen pressure are set to pressure values suitable for the cutting and the printing by a control circuit 71 based on an amount of rotation of the Z-axis motor 34, respectively.

Figure 3:
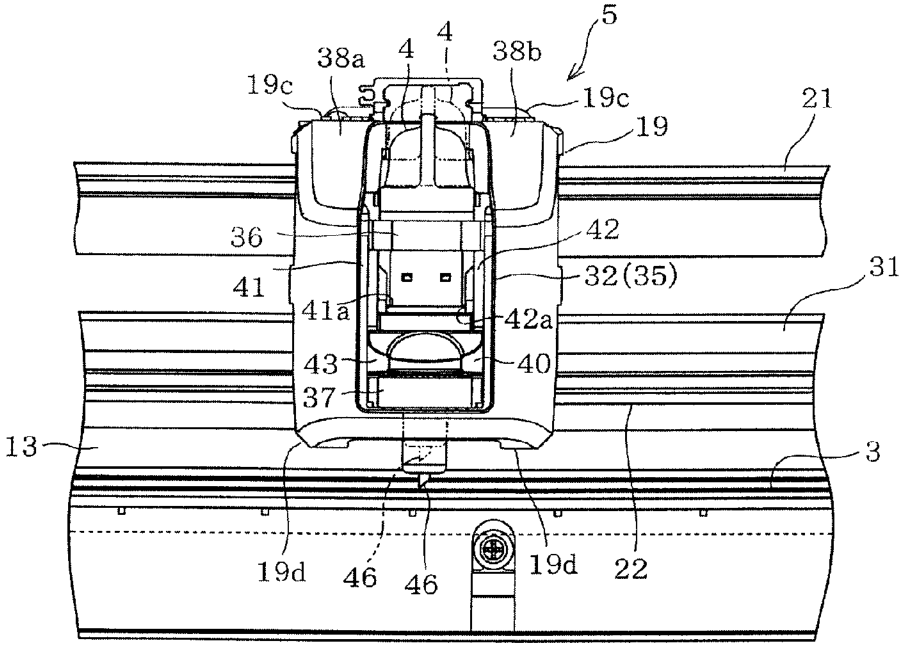
FIG. 3 is an example of a front view of a processing head and its periphery.
Figure 4A:
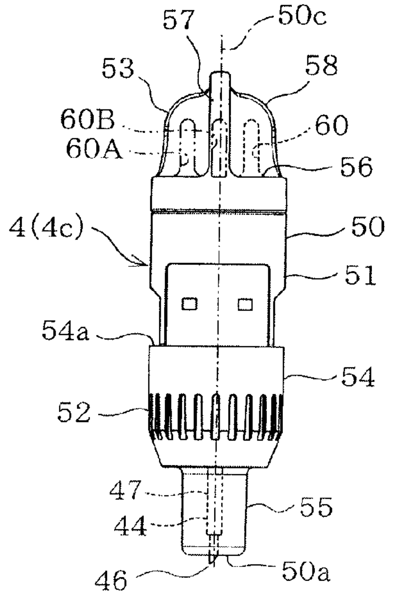
FIGS. 4A and 4B are examples of front views of examples of a cutter cartridge and a pen cartridge respectively.
Figure 4B:
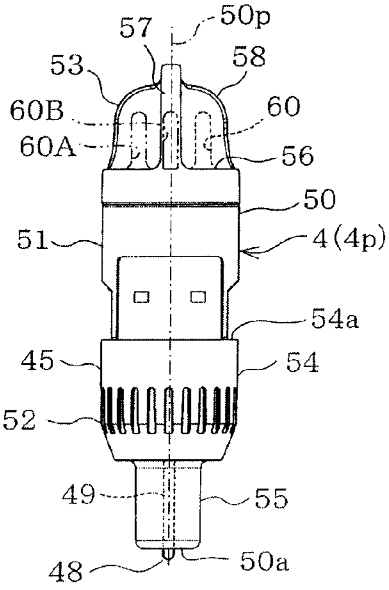
Figure 5:
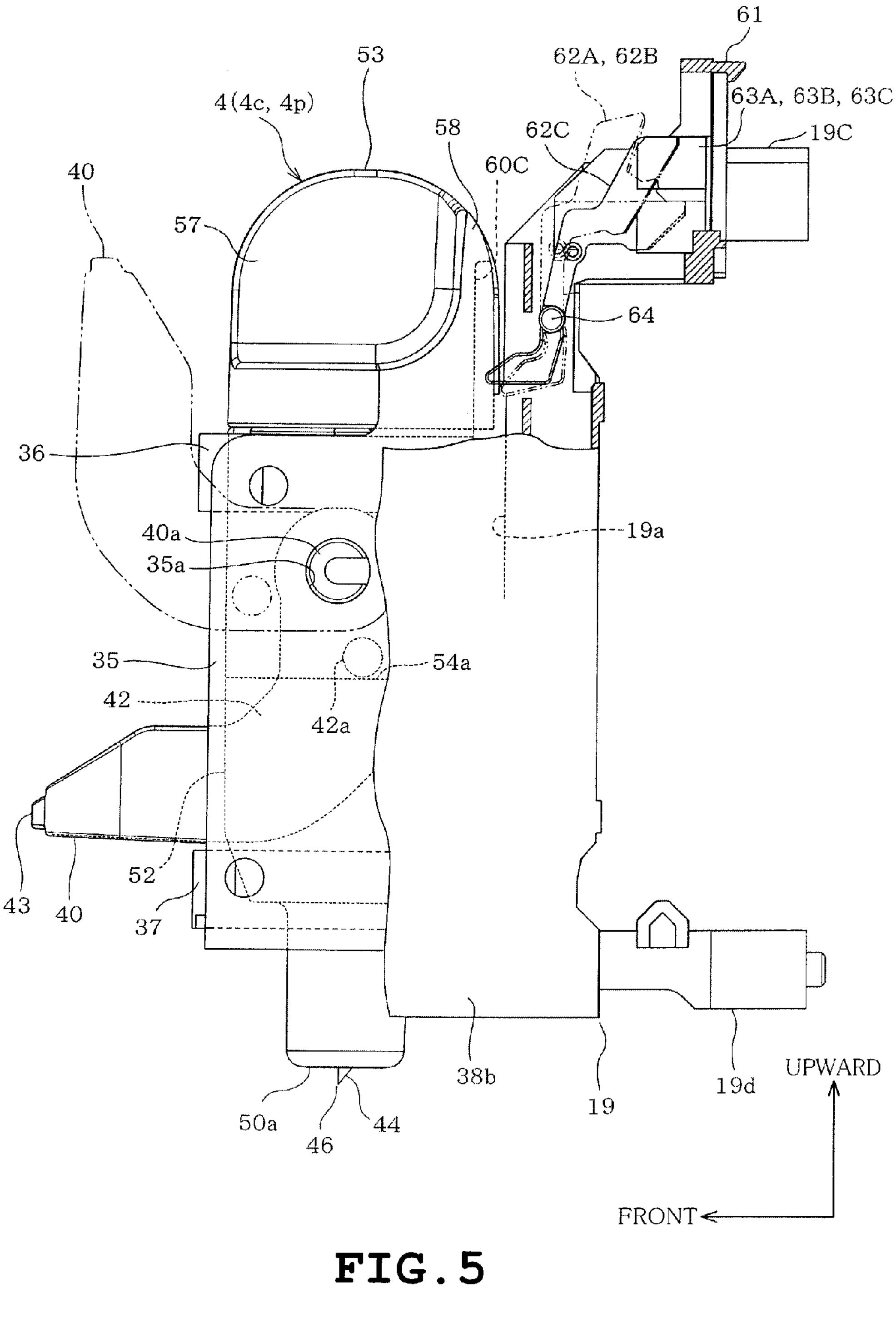
FIG. 5 is an example of a right side view of a cartridge holder and its vicinity with a cover member being partially broken in the state where the cartridge is attached.

The cartridge holder 32 includes a holder frame 35 and upper and lower holders 36 and 37 as shown in FIGS. 2, 3 and 5. The holder frame 35 is driven upward and downward by the up-down drive mechanism 33. The upper and the lower holders 36 and 37 are fixed to the holder frame 35. More specifically, a cover member 38 is provided on the front wall 19*a* of the carriage 13 so as to cover right and left sides of the front wall 18*a* from front. The holder frame 35 serving as movable part is disposed between a left projection part 38*a* and a right projection 38*b* of the cover member 38. The holder frame 35 is formed into a C-shape (see FIG. 2) and has a top, underside and front ail of which are open. The upper and lower holders 36 and 37 are attached so that the cartridge 4 is inserted through the both holders from above. The upper and. lower holders 36 and 37 are each formed into a frame shape housed in the holder frame 35.

The holder frame 35 is provided with a lever member 40 located between the upper and the lower holders 36 and 37 as shown in FIGS. 3 and 5. The lever member 40 has a pair of right and left arms 41 and 42 and an operating portion 43 which is provided so as to connect between distal end sides of the arms 41 and 42. Furthermore, the lever member 60 has a proximal end formed with pivot portions 40*a* and 40*b* located at outer surface sides of the arms 41 and 42 respectively. Only the right pivot portion 40*a* is shown in FIG. 5. The holder frame 35 has right and left sidewalls formed with circular holes respectively. Only right circular hole 35*a* is shown. The pivot portions 40*a* and 40*b* are inserted through circular holes 35*a* respectively. The arms 41 and 42 include respective inner surface sides provided with small columnar engagement portions 41*a* and 42*a* (see FIGS. 3 and 5). The engagement portions 41*a* and 42*a* are formed so as to be engageable with engaged portions 54*a* of the cartridge 4 respectively.

As a result, the lever member 40 is swung about, the pivot portions 40*a* serving as a center of swinging motion so as to be switchable between an open position shown by alternate long and two short dashes line in FIG. 5 and a fixed position show by solid line in FIG. 5. As shown in FIG. 5, the engagement portions 41*a* and 42*a* engage the engaged portions 54*a* respectively when the lever member 40 is located at the fixed position. As the result of the engagement, the cartridge 4 is fixed to the lower holder 37 (the cartridge holder 32). On the other hand, when operated so as to be pulled frontward, the lever member 40 is swung from the fixed position to the open position. With this swing, the engagement portions 41*a* and 42*a* depart from the respective engaged portions 54*a*, whereby the lever member 40 is released from the fixed state.

The cartridge 4 which is detachably attached to the cartridge holder 32 will now be described. FIGS. 4A and 4B exemplify cartridges 4*c* and 4*p* of the cutter 44 and the pen 45 respectively. As shown, the cartridge 4*c* of the cutter C and the cartridge 4*p* of the pen P include the same case 50 and are selectively attached to the cartridge holder 32. More specifically, the case 50 includes a case body 51, the cap 52 and a knob 53. The cap 52 and the knob 53 are provided on one end and the other end of the body 51 respectively. The case body 51 is formed into a cylindrical shape and extends in the up-down direction.

The cap 52 includes a larger-diameter portion 54 and a smaller-diameter portion 55 and is accordingly formed into the shape of a stepped bottomed cylindrical container. The larger-diameter portion 54 is fitted with a lower end of the case body 51. The larger-diameter portion 54 has an upper end serving as an engaged portion 54*a* which abuts on the engagement portions 41*a* and 42*a* of the lever member 40. The larger-diameter portion 54 has a lower end which is fitted with the lower holder 37 of the cartridge holder 32. The cap 52 has an underside 50*a* formed into a flat shape. The underside 50*a* has a through hole (not shown) through which the blade edge 46 of the cutter 44 or the pen tip 48 is inserted. The knob 53 has a cover plate 56, a knob plate 57 and a rear plate 58 both provided on an upper part of the cover plate 56. The cover plate 56 is fixed to an upper end of the case body 51. The knob plate 57 is mounted on a central part of the cover plate 56 in the right-left direction so as to be directed vertically.

The cartridge 4*c* shown in FIG, 4A includes the cutter 44 serving as a cutting unit. The cutter 44 has a proximal end or a cutter shaft 47 and a distal end (a lower end) or the blade edge 48, both of which are formed integrally with the cutter 44. The cutter shaft 47 is formed into a round bar shape and is housed in the case 50. The blade of the cutter 44 is formed into a substantially triangular shape tilted relative to the object S although not shown in detail in the drawings. Furthermore, bearings are provided, in the case body 51 to support the cutter shaft 47 so that the cutter shaft 47 is rotatable about a central axis 50*c* thereof. The blade edge 46 protrudes from the underside 50*a* of the cap 52. The cartridge 4*c* is constructed so that a central axis 50*c* of the cutter shaft 47 corresponds with a central axis of the cap 52.

The cartridge 4*p* shown in FIG. 4B is a printing instrument formed into the pen 45 and has a distal end or the pen tip 48 from which ink is caused to seep. An ink tank (not shown) is provided in the case body 51 to supply ink to a pen tip member 49. The pen tip 48 protrudes from the underside 50*a* of the cap 52. The cartridge 4*p* is constructed so that a central axis 50*p* of the pen tip 48 corresponds with a central axis of the cap 52.

Any one of three grooves 60A to 60C is formed in the rear plate 58 of the knob 53 so that the rear plate 58 is a concavo-convex portion, as shown in FIGS. 4A and 4B. The grooves 60A to 60C have different concavo-convex patterns according to types of the cartridges 4. More specifically, for example, the cutting cartridge 4*c* or the printing cartridge 4*p* can be discriminated based on presence or absence of the groove 60C at the right end of the rear plate 58, as shown in FIGS. 4A and 48. In other words, for example, the cartridges 4*c* and 4*p* as shown in respective FIGS. 4A and 4B differ from each other in the presence or absence of the groove 60C at the right end of the rear plate 58. The groove 60*c* can discriminate between the cutting cartridge 4*c* and the printing cartridge 4*p*. Furthermore, for example, the color type of the pen 45 can be discriminated based on presence or absence of the grooves 60A and 60B of the cartridge 4*p*.

The carriage 19 is provided with a defection unit which is located at an upper side facing the rear plate 58 of the cartridge 4, as shown in FIG. 5. The detection unit may include, for example, three contacts 62A to 62C and three type detection sensors 63A to 630 all provided on a substrate holder 61.

The type detection sensors 63A to 63B mounted on a substrate of the substrate holder 61 so as to be arranged from side to side. The type detection sensors 63A to 63C are comprised of optical sensors (photointerrupters). The contacts 62A to 62C are formed into the shape of a plate extending over the side of the type detection sensors 63A to 63C. The contacts 62A to 62C have lengthwise middle portions formed with shafts 64 respectively. The substrate holder 61 is provided with bearings (not shown) swingably supporting the shafts 64 respectively. The contacts 62A to 62C are supported by the respective bearings so as to be lined in the direction of plate thickness. Three extension coil springs (not shown) extend between upper portions of the contacts 62A to 62C and the substrate holder 61 respectively. The contacts 62A to 62C are biased by the extension coil springs in a direction such that the upper portions of contacts 62A to 62C are tilted, toward, the type detection sensors 63A to 63C respectively. In other words, the biasing forces of the extension coil springs act in a direction, such that lower ends of the contacts 62A to 62C come into contact with the rear plate 58 of the knob 53.

For example, when the cartridge 4*c* of the cutter 4 is attached to the cartridge holder 32, the lower ends of the contacts 62A and 62B come into contact with the rear plate 58, thereby swinging. With the swinging, the upper ends of the contacts 62A and 62B are departed from the type detection sensors 63A and 63B respectively (see two-dot chain line in FIG. 5). On the other hand, the lower end of the other contact 62C remains tilted toward the groove 60C of the rear plate 58. Accordingly, the upper end of the contact 62C is fitted at the type detection sensor 63C side.

The cartridge 4*c* of the cutter 44 is attached to the cartridge holder 32 in cutting the object S. In this case, the control circuit 71 identifies the type of the cartridge 4*c*, based on detection signals of the contacts 62A to 62C generated by the type detection sensors 63A to 63C respectively. The control circuit 71 then controls the up-down drive mechanism 33 to move the cartridge 4*c* to the lowered position and sets the blade edge 46 to the above-mentioned cutter pressure. In this case, the blade edge 46 penetrates the object S on the holding member 10 to be put slightly into the holding member 10. In this state, the holding member 10 end the cartridge 4*c* (the cutter 44) are moved in the X and Y directions relative to each other by the transfer mechanism 7 and the head moving mechanism 8, respectively. The cutting of the object S is executed by this relative movement.

On the other hand, the cartridge 4*p* of the pen 45 is attached to the cartridge holder 32 in printing the object S. In this case, the control circuit 71 identifies the type of the cartridge 4*p*, based on detection signals of the contacts 62A to 62C generated by the type detection sensors 63A to 63C respectively. The control circuit 71 then controls the up-down drive mechanism 33 to move the cartridge 4*p* to the lowered position and sets the pen tip 43 to the above-mentioned pen pressure. In this case, the pen tip 48 penetrates the object S. In this state, the holding member 10 and the cartridge 4*p* (the pen 45) are moved in the X and Y directions relative to each other by the transfer mechanism 7 and the head moving mechanism 8, respectively. The printing of the object S is executed by this relative movement. An XY coordinate system with a left corner of the adhesive layer 10*v* serving as an origin O is set in the processing apparatus 1, as shown in FIG. 1. The above-described relative movement of the holding member 10 (the object S) and the processing head 5 (the cutter 44 or the pen 45) is carried out on the basis of the XY coordinate system.

The processing apparatus 1 according to the example is provided with a scanner 6 serving as an image obtaining unit shown in FIG. 2. The scanner 6 is comprised of a contact image sensor (CIS), for example. The scanner 6 includes a line sensor including a plurality of image pickup devices lined in the right-left direction, a light source (a lamp) and lens, all of which are composed integrally. The scanner 6 has a length substantially the same as the width of the holding member 10 and extends in the right-left direction. The scanner 6 is disposed in the rear of the guide rail 22 and directed downward. The scanner 6 has an underside having a read part which reads an image on the surface of the object S while being in proximity to the upper surface of the object S.

The scanner 6 is controlled by the control circuit 71. More specifically, the control circuit 71 controls the transfer mechanism 7 to move the holding member 10 rearward or in the Y direction. The control circuit 71 controls the scanner 6 so that a reading operation by the scanner 6 (scanning in the X direction) is repeatedly executed in synchronization with the movement of the holding member 10. The control circuit 71 obtains two-dimensional image data of the object S by the above-described control manner. The carriage 19 has an underside provided with a sheet detection sensor 76 (see FIG. 6). The sheet detection sensor 76 detects a distal end position of the holding member 10 set on the platen 3 and accordingly a Y-directional position of the holding member 10. A detection signal generated by the sheet detection sensor 76 is supplied to the control circuit 71.

Furthermore, the control circuit 71 is configured to process the image data of the object 3 read by the scanner 6 in a known image processing manner. In this case, the control circuit 71 extracts patterns, colors of patterns A to C (see FIG. 1) affixed to the object S, and the like. Based on data of the extracted patterns, colors and the like, the control circuit 71 controls the display 9*a* and generates cutting or printing data of the patterns.

Figure 9A:
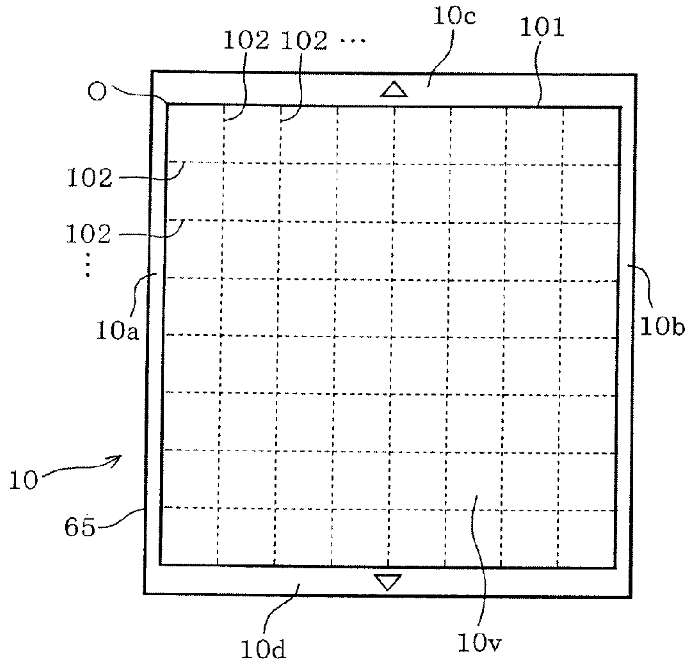
FIGS. 9A and 9B are examples of a plan view of a holding member to which no object is applied and an enlarged view of a base line of the holding member, respectively.

The holding member 10 and the read holding member 20 will now be described. The holding member 10 as shown in FIGS. 1 and 9A is made of a soft resin material, for example. The holding member 10 includes a base 65 and an adhesive layer 10*v* formed on the base 65. The adhesive layer 10*v* is located, at a side of the base 65 opposed to the cutter 44 or the surface side of the base 65. The adhesive layer 10*v* is provided in an inner rectangular region of the base 65 except for right and left edges 10*b* and 10*a* and front and rear edges 10*c* and 10*d*. The adhesive layer 10*v* is made of a transparent adhesive material. The user affixes the object S to be processed or read onto the adhesive layer 10*v*, whereby the object S is removably held on the holding member 10. The adhesive layer 10*v* has an adhesive force set to a small value such that the object S can be removed from the adhesive layer 10*v* easily without being broken. The adhesive force of the adhesive layer 10*v* is further set so that the object S can be reliably held so as to be immovable during the processing and so that the object S can be easily torn after processing.

The holding member 10 is provided with base lines defining a region of the adhesive layer 10*v*. The base lines include a first base line 101 and a plurality of second base lines 102. The first base line 101 is formed into a rectangular shape and extends along an outer edge of the adhesive layer 10*v*. The second base lines 102 divide the adhesive layer 10*v* into a plurality of parts each of which has a predetermined size. The first and second base lines 101 and 102 are printed on the surface of the base 65, for example. Accordingly, the base lines 101 and 102 are visible through the transparent adhesive layer 10*v*. The region of the adhesive layer 10*v* encompassed by the first base line 101 serves as a process able region (placement region). The seven second base lines 102 extend in the front-rear direction and in the right-left direction to divide the placement region into sixty-four equal parts. The number of parts divided by the second base lines 102 may be changed appropriately. Thus, the first and second base lines 101 and 102 of the holding member 10 are formed into a grid shape as a whole. The base lines 101 and 102 provide an indication of a position or a size when the object S is affixed to the adhesive layer 10*v*.

Figure 9B:
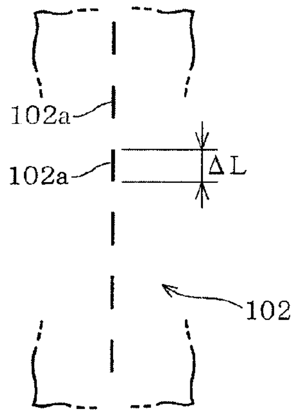

FIG. 9B shows an enlarged second base line 102. Each second base line 102 is a broken line composed by aligning a number of line segments 102*a*. at regular intervals into a linear shape. Each line segment 102*a* has a length ΔL less than 1 mm, for example. A whole pattern of the aligned line segments 102*a* serves as a marker indicative or a position where the object is held. Each line segment 102*a* is only required to be composed of a pattern having a smaller size than a minimum size that will be described later. Each line segment 102*a* may be composed by linearly aligning dots instead of the line segments, for example.

Cutting marks caused by the cutter 44 are gradually accumulated on the surface of the holding member 10 when the holding member 10 is used repeatedly for cutting. The adhesive force of the adhesive layer 10*v* is gradually reduced as affixing and removal of the object S repeated. Accordingly, the holding member 10 is a consumable supply which needs to be replaced by a new one after use at ten several times.

On the other hand, FIG. 10 shows the read holding member 20 used instead of the above-described holding member 10. The read holding member 20 is used to hold an object S' to be read but not to be processed. The read holding member 20 includes a base 68 which is made of a soft resin material and formed into a rectangular sheet shape. The base 88 has a width which is equal to the width of the base 65 of the holding member 10. The base 68 has a surface side provided with an identification portion 70, a transparent sheet 69 and base lines 103 and 104. The identification portion 70 serves as an indication of the read holding member 20. The read holding member 20 will be hereinafter referred to as "holding member 20."

The transparent sheet 69 holds the sheet-shaped, object S' such as photograph serving as an original for generation of processed data. The transparent sheet 63 is disposed on a placement region on the upper surface of the base 68 with the object S' being held between the base 68 and the transparent sheet 69. The placement region is an inner rectangular region of the base 68 except for front and rear edges 68*c* and 63*d* and right and left edges 68*a* and 68*b*. The transparent sheet 69 is comprised of a rectangular soft resin sheet having a high transparency. The transparent sheet 69 has a front edge 69*a* bonded to the base 68. The whole transparent sheet 69 overlaps the placement region of the base 68 and is closed. The user picks the rear end side of the transparent sheet 69 upward from the base 68, whereby the transparent sheet 69 is open. Thus, the transparent sheet 69 is openable and closable. The user picks the transparent sheet 69 upward with the result, that the transparent sheet 69 is open, and places the object S' on the placement region. The user then overlaps the transparent sheet 69 with the object S' being held between the base 68 and the transparent sheet 69, whereby the transparent sheet 69 is closed. As a result, the object S' is held on the holding member 20. Accordingly, the object S' can be reliably held so as to be immovable and can be easily detached after reading. The scanner 6 is capable of reading an image on the upper surface of the object S' through the transparent sheet 69.

The base lines 103 and 104 are configured in the same manner as the base lines 101 and 102 of the base 65 of the holding member 10. More specifically, a region encompassed by the first base line 103 serves as the placement region of the base 68. Seven base lines 104 extend in the front-rear and right-left directions thereby to equally divide the placement region into sixty-four parts. The number of parts to be divided by the base lines 104 may be changed appropriately. Thus, the first and second base lines 103 and 104 of the holding member 20 are formed into a grid shape as a whole. The base lines 103 and 104 provide an indication of a position or a size when the object S' is placed on the placement region. Furthermore, each second base line 104 serves as a marker of broken line in the same manner as in each second based line 102. More specifically, each second base line 104 is composed of a number of line segments 102*a*. The marker should not be limited to the second base lines 102 and 104 but may be represented by a plurality of line segments 102*a* and/or a plurality of dots. The marker may further be a character, numeral or symbol indicative of the position where the object S or S' is held.

The identification portion 70 of the base 68 is comprised of a mark including three black circles aligned in the right-left direction. A pair of three black circles are provided on right and left ends of a front edge 68*c* of the base 68 surface respectively. When the scanner 6 reads the identification portion 70, the control circuit 71 determines that the holding member 20 is attached. The above-described holding member 20 is also transferred by the transfer mechanism 7 while the right and left edges 68*b* and 68*a* are held between the driving roller 12 and the roller portions 13*a* of the pinch roller 13. Furthermore, an XY coordinate system with the left corner of the placement region (first base line 103) serving as the origin O.

Figure 6:
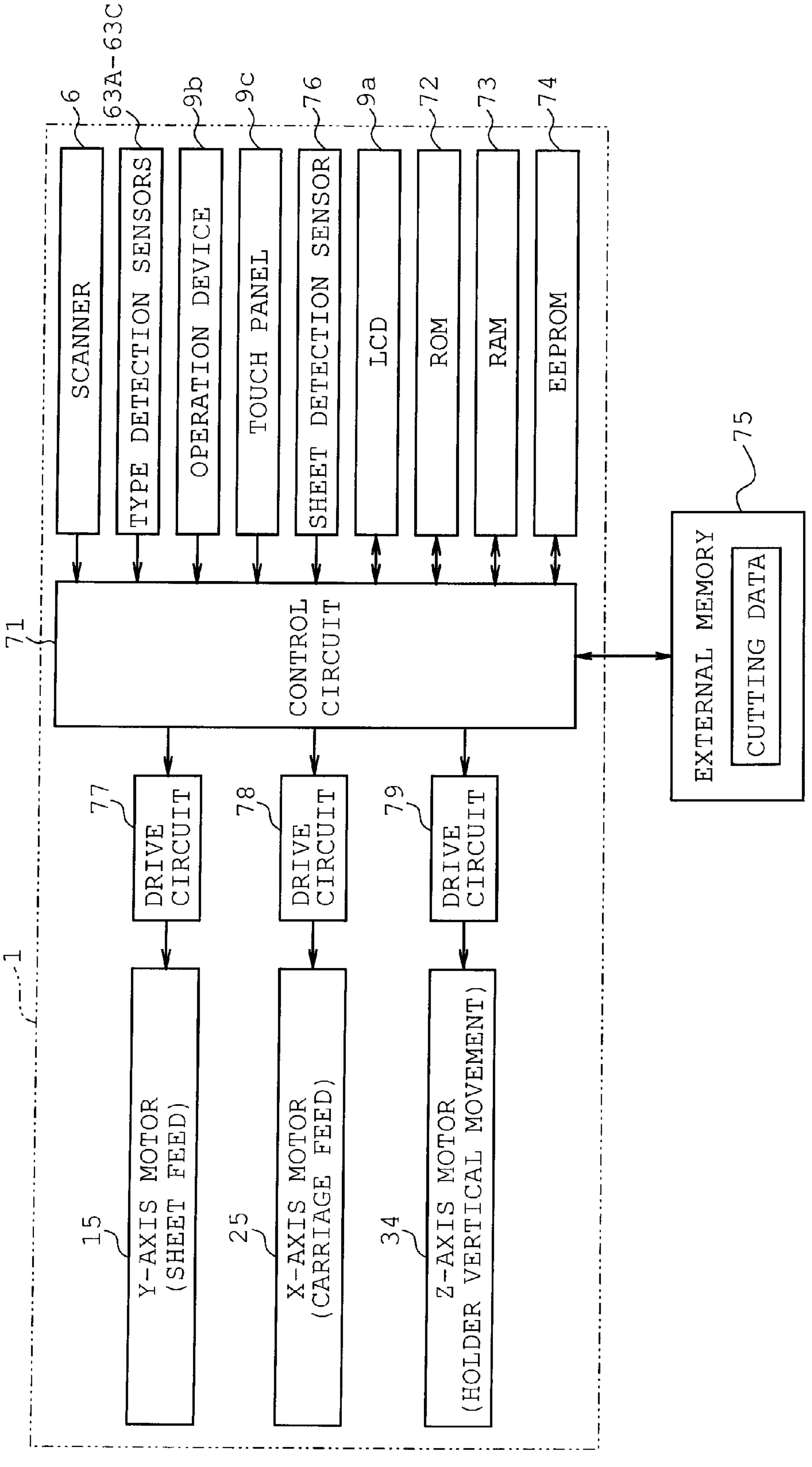
FIG. 6 is an example of a schematic block diagram showing an electrical configuration of the apparatus.

The control system of the processing apparatus 1 will be described with reference to FIG. 6, The control circuit 71 is a control unit controlling the entire processing apparatus 1. The control circuit 71 is mainly configured of a computer (CPU). To the control circuit 71 are connected a ROM 72, a RAM 73, an EEPROM 74 and an external memory 75. The ROM 72 stores a cutting control program, a printing control program, a display control program, a cutting data generation program, a printing data generation program, a data processing program which will be described later. The cutting control program is provided for controlling a cutting operation. The printing control program is provided for controlling a printing operation. The display control program is provided for a displaying operation of the display 9*a*. The cutting data generation program is provided for generating cutting data based on the above-mentioned image data. The printing data, generation program, is provided for generating printing data based on the image data. The external memory 75 stores the cutting data and the printing data. The cutting data is provided tor cutting a plurality of types of patterns. The printing data is provided for printing a plurality of types of patterns.

Signals are supplied to the control circuit 71 from the sheet detection sensor 76, the type detection sensors 63A to 63C, the scanner 6 and the like. To the control circuit 71 are connected the display 9*a*, the touch panel 9*c* and various operation switches of the operation device 9*b*. While viewing a display screen of the display 9*a*, the user operates various switches of the operation device 9*b* or the touch panel 9*c*. As a result, the user can select a desired pattern and set various processing modes and parameters. To the control circuit 71 are further connected drive circuits 77, 78 and 79 driving the Y-axis motor 15, the X-axis motor 25 and the Z-axis motor 34, and the like. Based on the cutting or printing data, the control circuit 71 controls the Y-axis motor 15, the X-axis motor 25, the Z-axis motor 34 and the like so that a cutting or printing operation is automatically executed for the object S on the holding member 10.

The control circuit 71 of the example constitutes a processing data generation unit which generates the cutting data and the printing data based on the image data. The cutting data and the printing data will be collectively called "processing data" hereinafter. Additionally, the cutting operation and the printing operation both controlled by the control circuit 71 will be collectively called "processing operation" hereinafter.

The cutting data will be described with an exemplified case where patterns printed on the object S are cut. Here specifically, the object 3 is a piece of paper on which are printed a pattern A of "quadrangle," a pattern B of "heart" and a pattern C of "circle." The paper is an object to be read and to be cut. The object S is large enough to cover an entire placement region (the region encompassed by the first base line) of the holding member 10. The user attaches the object S to the holding member 10 so that the object S is held on the holding member 10 and then set the holding member 10 on the processing apparatus 1.

Figure 8:
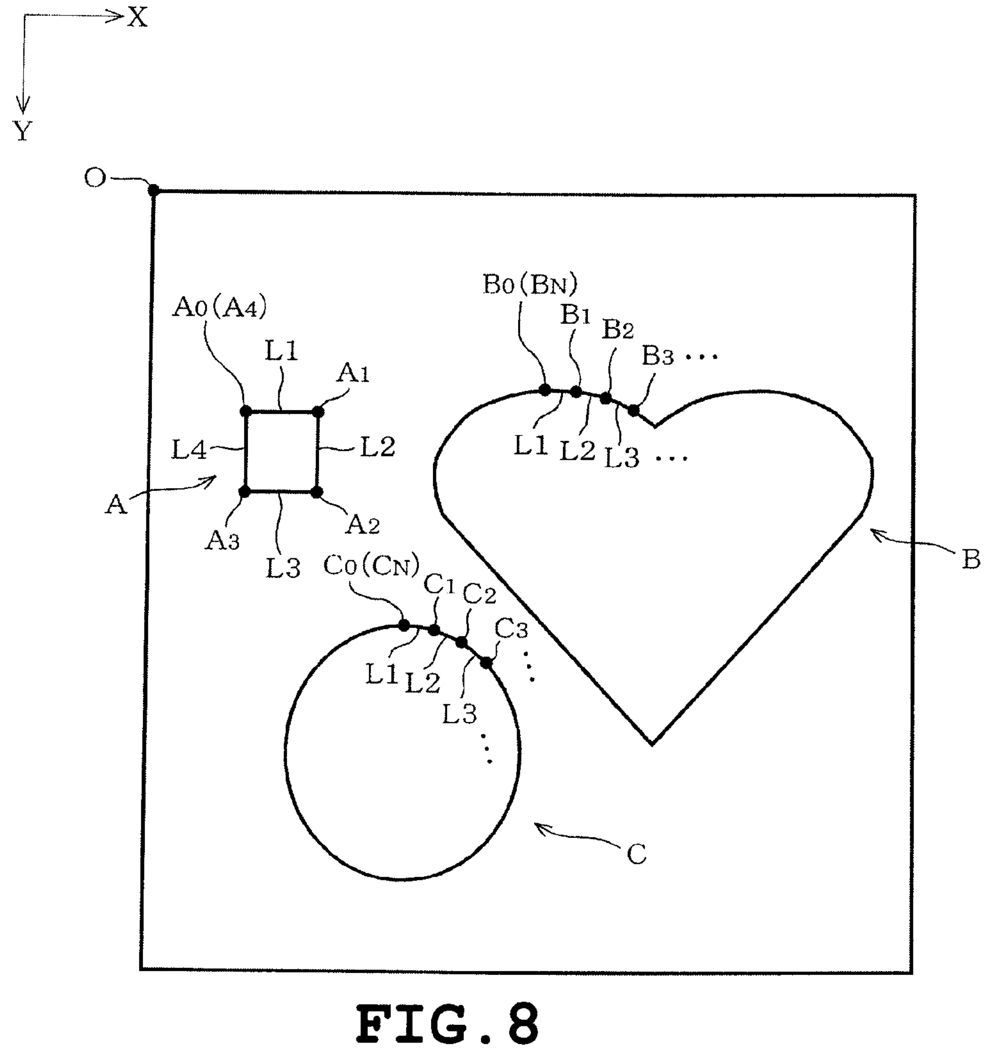
FIG. 8 illustrates an example of a pattern to which processing is applied based on processing data.

In this case, image data of the object S is obtained by the above-described scanner 6. Furthermore, data indicative of the patterns A to C in the placement region is generated on the basis of the image data. More specifically, as shown in FIG. 8, data of coordinate values of apexes $A_0$, $A_1$, $A_2$ and $A_3$ is extracted from line segments composing an outline of the pattern A. The apexes $A_0$ to $A_3$ include one in which X and Y coordinates are minimum (upper left side in FIG. 8). This apex is set as a cutting start point $A_0$ and a cutting end point $A_4$. Thus, cutting line data of the pattern of "quadrangle" is generated with respect to the pattern A. The pattern of "quadrangle" is composed of line segments L1, L2, L3 and L4 connecting among the cutting start point $A_0$, apex $A_1$, apex $A_2$, apex $A_3$ and cutting end point $A_4$. The cutting line data of the pattern A includes first to fifth coordinate data corresponding to the cutting start point $A_0$, apexes $A_1$ to $A_3$ and cutting end point $A_4$ respectively (see FIG. 7).

Data of coordinate values of apexes $B_1$, $B_1$, $B_2$, . . . is also extracted from line segments composing an outline of the pattern B. The apexes $B_0$, $B_1$, $B_2$, . . . includes one which is located at the left upper side and set as a cutting start point $B_0$ and a cutting end point $B_N$. An outline of pattern B includes an arc part which is divided at predetermined intervals, and coordinate values of apexes are computed. Thus, cutting line data of the pattern of "heart" is generated with respect to the pattern A. The pattern of "heart" is composed of line segments L1, L2, L3 and L4 connecting among the cutting start point $B_0$, apex $B_1$, apex $B_2$, . . . and cutting end point $B_N$. The cutting line data of the pattern B includes first to (N+1)-th coordinate data corresponding to the cutting start point $B_0$, apexes $B_1$ to (N+1)-th coordinate data respectively (see FIG. 7).

Regarding line segments composing an outline of the pattern C, a cutting start point $C_0$ and $C_N$ are set in the same manner as the pattern B. The pattern C has an outline with a circumference which is divided at predetermined intervals, and coordinate values of apexes $C_0$ . . . are computed. Thus, cutting line data of the pattern of "circle" is generated with respect no the pattern C. The pattern of "circle" is composed of line segments L1, 12, L3, . . . connecting among the cutting start point $C_0$, apex $C_1$, apex $C_2$, . . . and cutting end point $C_N$. The cutting line data of the pattern C includes first to (N+1)-th coordinate data corresponding to the cutting start point $C_0$, apexes $C_1$ to (N+1)-th coordinate data respectively (see FIG. 7).

FIG. 7 is a conceptual diagram showing cutting data (full data) of the patterns A to C. The cutting data includes delimited data suffixed to the cutting line data of the patterns A to C. The cutting data also includes data of number of patterns and display data. The number of patterns is a total number of patterns A to C (three in this case).

The control circuit 71 causes the apparatus to execute a cutting operation to cut the patterns A, B and C sequentially in this order, based on the above-described cutting data, More specifically, firstly, the cutter 44 is relatively moved to the XY coordinates of the cutting start point $A_0$ by the transfer mechanism 7 and the head moving mechanism 8. The blade edge 46 of the cutter 44 is then caused to penetrate through the cutting start point $A_0$ part of the object S by the up-down drive mechanism 33. In this state, the blade edge 46 is relatively moved by the transfer mechanism 7 and the head moving mechanism 8 so as to connect linearly among the apexes A1, A2, A3 and A4 sequentially. Thus, the line segments L1, L2, L3 and L4 are cut sequentially continuously with the result that the pattern A of "quadrangle" is cut out.

The other patterns B and C are also cut out based on the cutting line data in the same manner as described above. Furthermore, based on the delimited data suffixed to each cutting line data, the blade edge 46 of the cutter 44 is departed from the object 3 by the up-down drive mechanism 33 every time the cutting of cutting line is finished.

The printing data will be described in the same manner as described with an exemplified case where the patterns A to C on the object S are printed. The printing data includes data of the number of patterns, printing line data, color data, delimited data and display data.

The printing line data of the patterns A to C is generated on the basis of the same image data of the object S as in the cutting line data. Accordingly, coordinate data is generated which corresponds to the printing and the cutting on the basis of coordinate values of the apexes of the patterns A to C extracted from the image data. As a result, printing line data of the pattern A has coordinate data including the start and end points of the line segments L1 to L4 shown in FIG. 6, which points are represented as XY coordinates. Printing line data of the patterns B and C also has coordinate data including the start and end points of the line segments L1 . . . , which points are represented as XY coordinates. The color data includes color information (RGB values, for example) of the patterns A to G obtained from the image data. A type of the color of the pen 45 is specified by the color information. The color date is set for every one of the patterns A to C so as to correspond to the printing line data.

In the printing, the cartridge 4*p* of the pen 45 of the relevant type is displayed on the display 9*a* on the basis of the color data. The user attaches the cartridge 4*p* to the cartridge holder 32 while viewing displayed contents on the display 3*a*. The control circuit 71 executes the above-described printing operation and relatively moves the pen 45 based on the printing line data, whereby the line segments L1 . . . of the patterns A, B and C are plotted sequentially in this order. As a result, the patterns of "quadrangle," "heart" and "circle" are printed along the outlines of the patterns A to C of the object 3 respectively. Limited data is suffixed to the printing line data of the patterns A to C respectively. The pen tip 48 is departed from the object S by the up-down drive mechanism 33 every time the plotting of the patterns A to C is completed on the basis of the delimited data.

Thus, in the processing apparatus 1, processing data is generated from the image data of the patterns A to C of the object S held on the holding member 10. The processing is executed on the basis of the generated processing data, with the result that the object S can be cut or printed.

When dust or trash adheres to the object S in generation of the above-mentioned processing data in generation of processing data, there is a possibility that the dust or trash is erroneously recognized as the pattern in the image reading. Furthermore, there is a possibility that an object S' smaller than the placement region would, be placed on the base 68. In this case, the image would, include the base lines 104 of the holding member 20. Accordingly, there is a possibility that processing data including the base lines 102*a* serving as a pattern would be generated. Furthermore, as shown in FIG. 10, when the object S' has a minute pattern ΔE, there is a possibility that the processing data would include the minute pattern.

Figure 11:
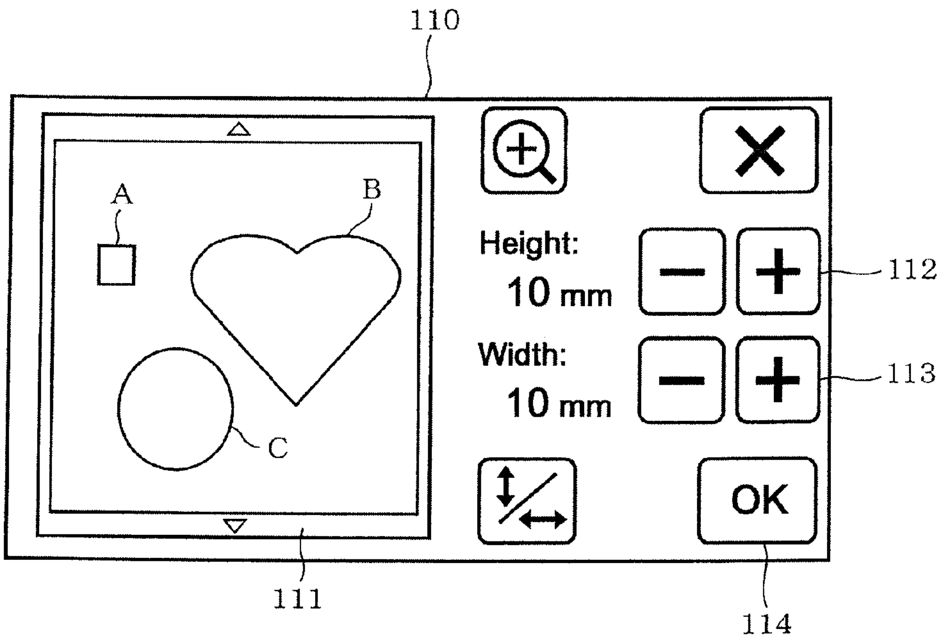
FIG. 11 illustrates an example of sire setting screen.
Figure 12:
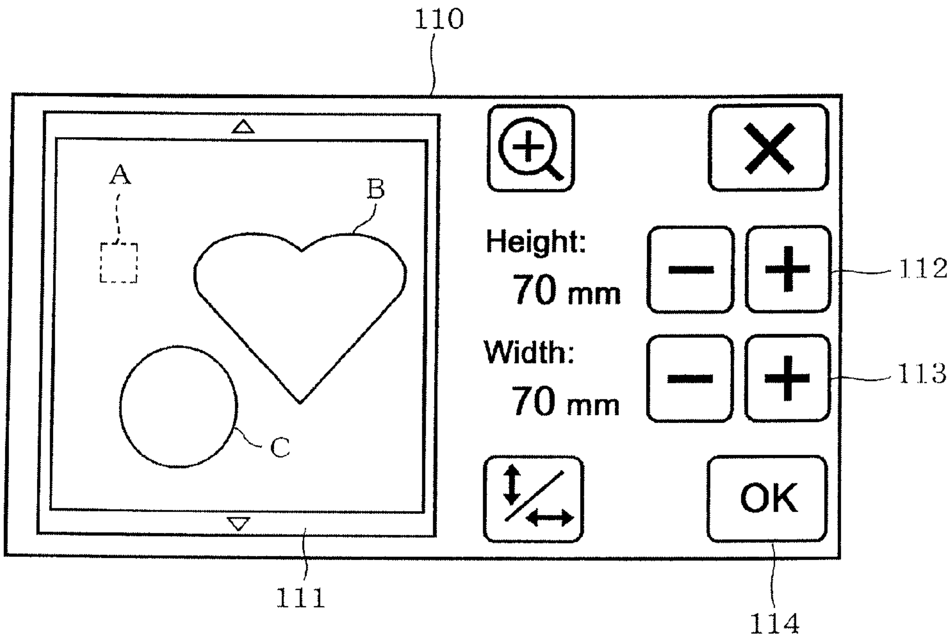
FIG. 12 is an example of a view similar to FIG. 11, showing the state where the sire is setting.
Figure 13:
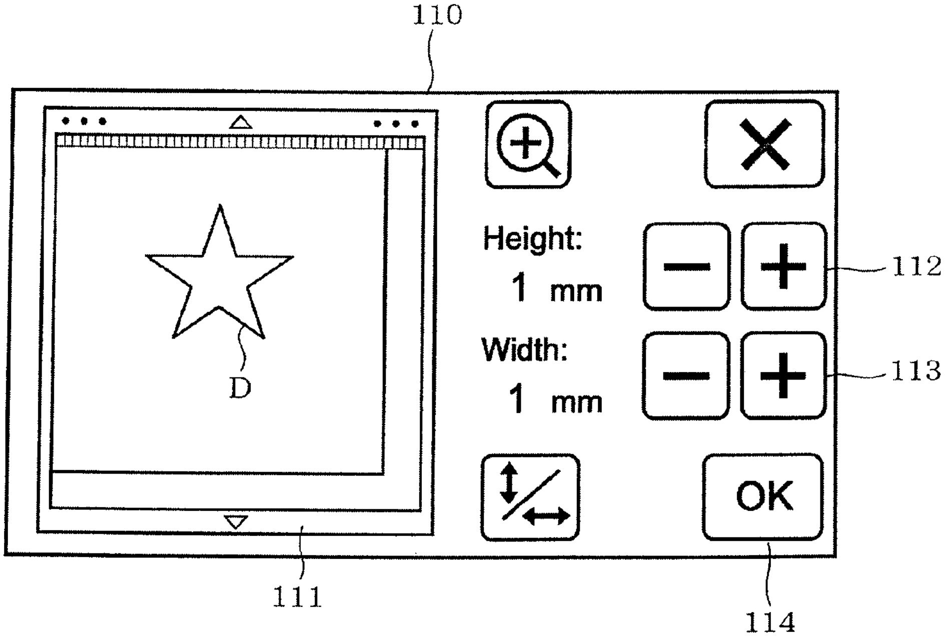
FIG. 13 is an example of a view similar to FIG. 11, showing an image with no marker of the holding member.

In view of the above-described problem, the site of invalid pattern to be eliminated in the image obtained by the scanner 6 is set in the embodiment. Processing data is generated after the invalid pattern not exceeding the size is eliminated from the image. Elimination of pattern will now be described with reference to FIGS. 11 to 14 with attention to a screen displayed on the display 9*a*. FIGS. 11 to 13 show a sire setting screen 110 for setting the size of invalid pattern to be eliminated. The size setting screen 110 is provided with a preview image region 111, a longitudinal size setting portion 112, a horizontal size setting portion 113, an OK key 114 and the like. The preview image region 111 is an image representing the object S or S' on a suitable scale on the basis of the image data. The longitudinal size setting portion 111 has a plus key and a minus key and the horizontal size setting portion 113 also has a plus key and a minus key. The user touches these plus keys and the minus keys with his/her finger (hereinafter, "touch operation"). The touch operation sets the size of invalid pattern to be eliminated in the image of the object S or S'. When the OK key 114 is touched, a processing start screen 115 as shown in FIG. 14 is displayed.

The processing start screen 115 is provided with a preview image region 118, a cut key 116, a draw key 117 and the like. A processing operation starts based on the processing data when any one of the keys is touched. A Y-direction sire of the invalid pattern to be eliminated is set by the longitudinal size setting portion 112. More specifically, the longitudinal and horizontal directions correspond to the Y and X directions in the processing apparatus 1. A mask size of the invalid pattern to be eliminated from the XY coordinate system is set in the size setting portions 112 and 113. More specifically, a size settable in the longitudinal size setting portion 112 ranges from 1 to 99 mm. Each size setting portion can optionally increase or decrease the set size by 1 mm by touch operation of the plus key and the minus key.

The control circuit 71 eliminates one or more patterns extracted from the image data and having a size not exceeding the size set by the longitudinal size setting portion 112 and the size set by the horizontal size setting portion 113. For example, as shown in FIG. 12, assume that the size is set at 70×70 mm by the size setting portions 112 and 113. In this case, the pattern A having a longitudinal and horizontal size not exceeding 70 mm in the patterns A to C is eliminated as the invalid pattern. The control circuit 71 is configured not to extract a pattern less than a minimum size (1×1 mm, for example) that can be set by the size setting portions 122 and 113 when patterns are extracted from the image data. The second base lines 102 and 104 of the holding members 10 and 20 are composed of line segments 102*a* each of which is less than 1 mm. Accordingly, the second base lines 102 and 104 are not displayed on the preview image region (see FIG. 13). Thus, the control circuit 71 eliminates an invalid pattern not exceeding the size set by the size setting portions 112 and 113. Furthermore, the control circuit 71 generates processing data based on an image without patterns of the base lines 102 and 104 irrespective of the set size.

Figure 14:
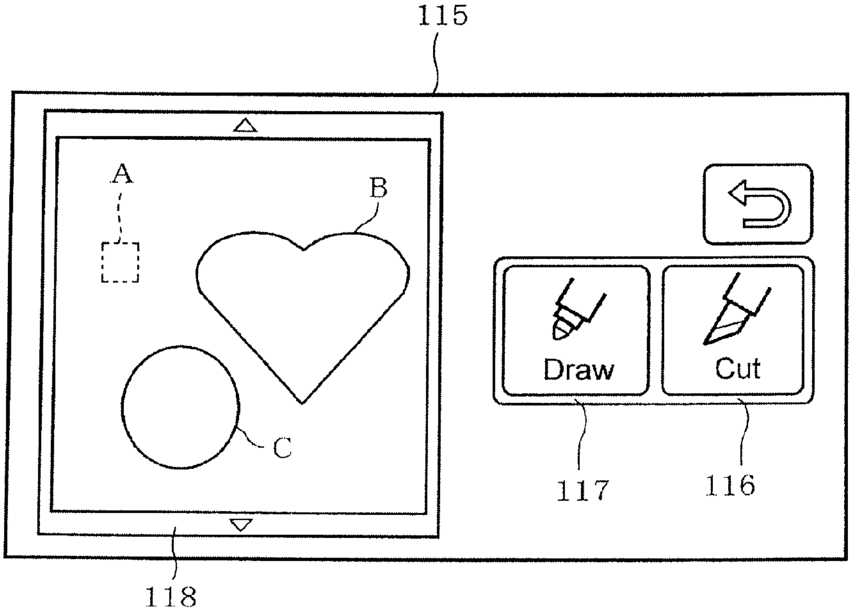
FIG. 14 illustrates an example of processing start screen.

FIG. 14 shows a processing start screen 115 having a preview image region 118 in which patterns B and C are composing the processing data are displayed. The above-described control circuit 71, the display 9*a* and the touch panel 9*c* serve as a size setting unit to set the size of invalid pattern to be eliminated in the image obtained by the image obtaining unit. The control circuit serves as an eliminating unit which eliminates from an image invalid pattern having a size not exceeding the size set by the size setting unit. Furthermore the control circuit 71 serves as a processing data generating unit which generates processing data for processing non-eliminated valid patterns, based on an image from which invalid patterns have been eliminated by the eliminating unit.

Figure 15:
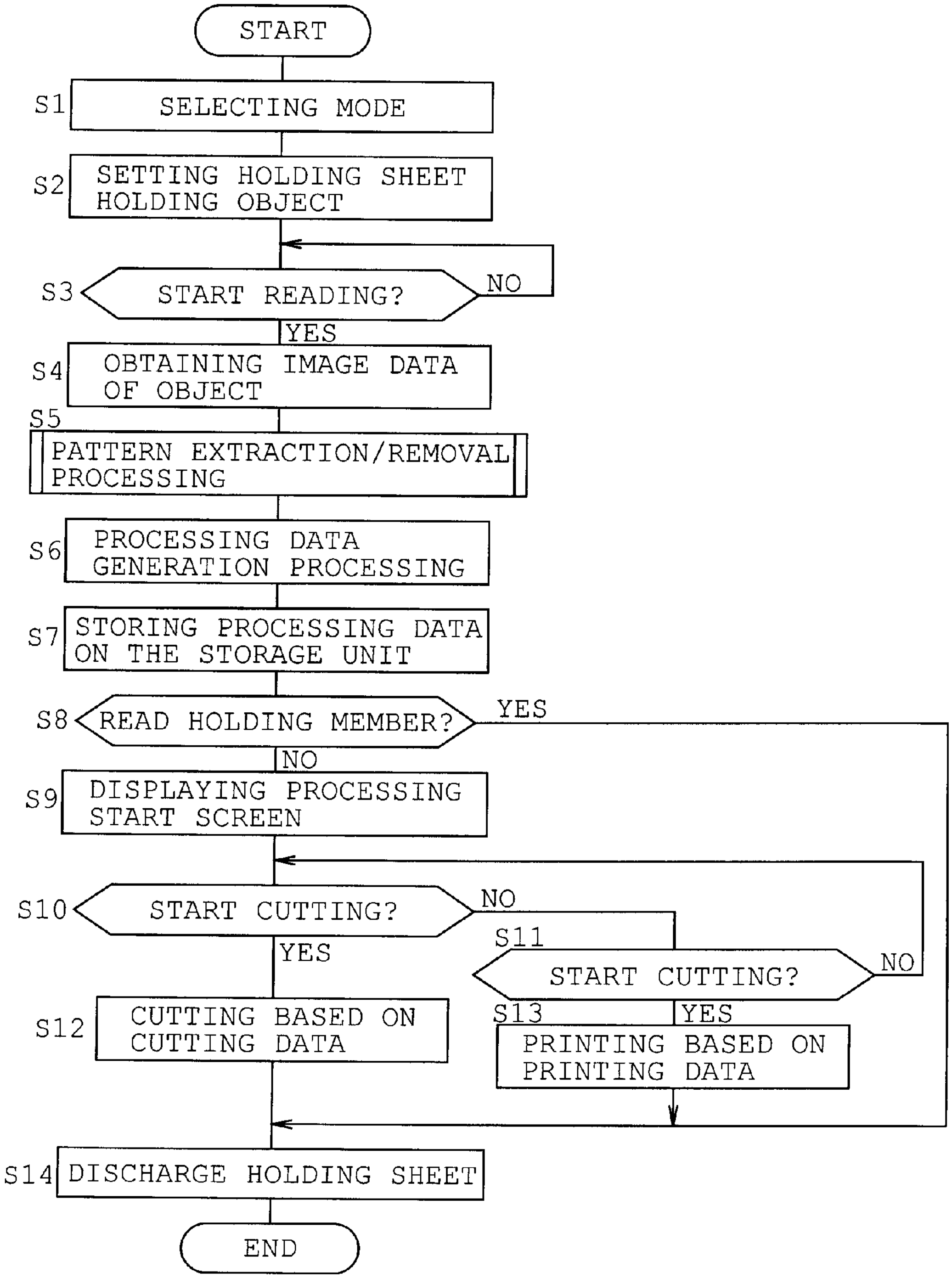
FIG. 15 is an example of a flowchart showing a data processing program.
Figure 16:
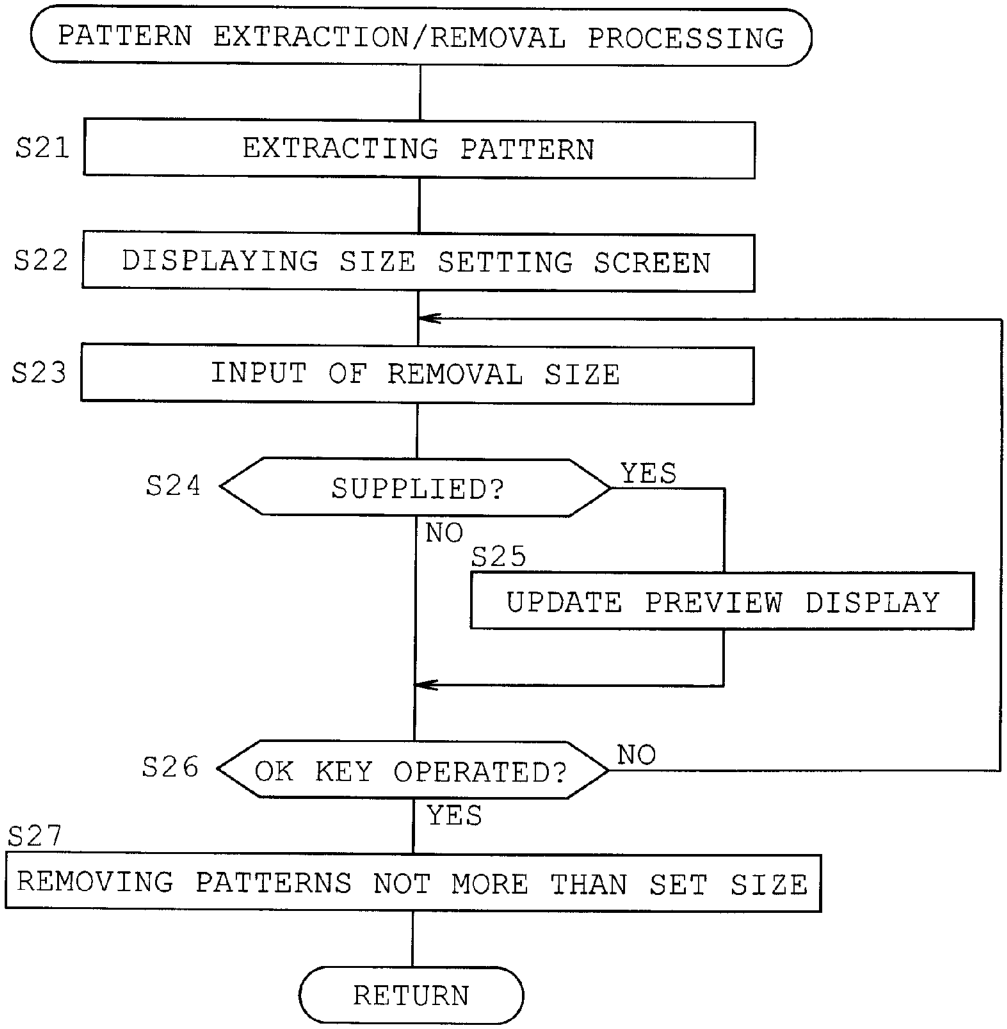
FIG. 16 is an example of a flowchart showing a pattern extracting and eliminating process.

The working of the above-described construction will be described with reference to FIGS. 15 and 16. FIGS. 15 and 16 are flowcharts showing a flow of a data processing program, including a processing operation executed by the control circuit 71. In the example, the image of the object S or S' is read for generation of processing data. The user selects a "scan" mode on a menu screen (not shown) of the display 9*a* (step S1).

When the user wants the processing apparatus 1 to execute the processing operation after read of image from the object 8, the user then applies the object S to the adhesive layer 10*v* so that the object S is adapted to the first base lines as shown in FIG. 1. The user than sets the holding member 10 on the platen 3 of the processing apparatus 1 (step 32). On the other hand, when causing the processing apparatus to execute reading of the image of the object S', the user picks the transparent sheet 69 of the read holding member 20 and places the object S' on a corner of the placement region of the base 68 or so that the object S' is adapted to the second base lies 104. The user then closes the transparent sheet 69 of the holding member 20, whereby the object S' is held. In this state, the holding member 20 is set on the platen 3 of the processing apparatus 1. In this case, when the distal end of the holding member 10 or 20 is detected by the sheet detection sensor 76, the left corner of the first base line 101 or 103 is set as the origin. When one or more of the switches of the operation switch device 9*b* is operated so that start of the reading is instructed (YES at step S3), the control circuit 71 causes the scanner 6 to execute a reading operation, thereby obtaining image data (step 34). The control device 71 then proceeds to step 35 for pattern extraction/elimination process (see FIG. 16).

In the pattern extraction/elimination process, the control circuit 71 executes known processing such as labeling or outline trace thereby to extract a patterns in the placement region from the obtained image (step S21). More specifically, when the obtained image is a binary or monochrome image, the control circuit 71 groups black pixels by assigning the same code to the black pixels of the black color adjacent to each other. Furthermore, the control circuit 71 determines whether or not a horizontal and vertical size of the grouped pixels groups commensurates with a size not less than a minimum size. In other words, the length on the holding member 10 or 20 (or object S, S') corresponding to the vertical and horizontal length of the pixel group is computed. When determining that the computed vertical and horizontal length is not less than 1×1 mm, the control circuit 71 extracts the pixel group as a pattern. As a result, pixel groups representing outlines of the patterns A to C are extracted as patterns in the case of object S. In the case of the object S', a pixel group representing the outline of pattern D is extracted as a pattern.

The control circuit 71 identifies an identification portion 70 located outside the placement region of the holding member 20, thereby discriminating the read holding member 20. Furthermore, when the obtained image is a color image, the control circuit 71 calculates a luminance value from RGB values of pixels. As a result, the control circuit 71 can extract a pattern by grouping pixels having luminance values less than a predetermined threshold.

Assume now that the obtained pixel contains noise (black dots) resulting from dust or the like on the object S. In this case, patterns other than the extracted patterns A to C are eliminated as black dots by the above-described extracting process. On the other hand, a minute pattern ΔE of the object S' as shown in FIG. 10 is also eliminated when having a sire less than the minimum size (see FIG. 13). Furthermore, the line segments 102*a* of the second base lines 104 are also patters smaller than the minimum size. Accordingly, even when the obtained image contains the second base lines 104 of the holding member 20 of the object S', the line segments 102*a* are eliminated (see FIG. 13). Thus, the display 9*a* displays a size setting screen 110 representing an image after extraction process in the preview image region 111 (step S22; and see FIGS. 11 and 13).

Furthermore, the user touches plus keys and minus keys of the size setting portion 112 or 113 on the size setting screen 110. The vertical and horizontal size of the invalid pattern to be eliminated can be optionally set by the touch operation (step S23). Assume that the set vertical and horizontal size is set to the minimum sire of 1×1 mm by the sire setting portions 112 and 113 regarding the object S', as shown in FIG. 13, for example. Even in this case, the above-mentioned black dots and the line segments 102*a* are not displayed in the preview image region 111.

On the other hand, assume that the set vertical and horizontal size is set to 70×70 mm by the size setting portions 112 and 113 regarding the object S, as shown in FIG. 12 (YES at step S24). In this case, the control circuit 71 detects an invalid pattern in the patterns A to C extracted from the image, based on the supplied set size. The detected invalid pattern has a vertical and horizontal size not exceeding 70 mm on the object S'. As a result, when detecting the pattern A, the control circuit 71 updates the pattern A to a grayout display image in the preview image region 111 (step 325). The grayout pattern A is represented by broken line in FIG. 12. However, the pattern A may be represented in any display mode that can discriminate the pattern A from the patterns B and C. Consequently, the user can view the patterns B and C from which processing data is to be generated.

When determining that the OK key 114 on the size setting screen 110 has been touched (YES at step S26), the control circuit 71 eliminates one or more patterns not exceeding the set size from the image as invalid patterns (step S27). The control circuit 71 then returns to step 6 in FIG. 15, proceeding to a processing data generating process. In the processing data generating process, the control circuit 71 generates processing data with remaining patterns as effective patterns, based on the image from which one or more patterns not exceeding the set site.

More specifically, in the case of object S, the control circuit 71 extracts data of coordinate values of apexes $B_0$, $B_1$, $B_2$, . . . of the effective "heart" pattern (see FIG. 8). As a result, the control circuit 71 generates cutting line data having first coordinate data, second coordinate data, third coordinate data, . . . , (N+1)-th coordinate data ail of which correspond to the cutting start point $B_0$, apex $B_1$, apex $B_2$, . . . , cutting end point $B_N$ respectively regarding pattern B (see FIG. 7). The control circuit 71 further extracts data of coordinate values of apexes $C_0$, $C_1$, $C_2$, . . . , regarding the effective "circle" pattern in the same manner as described above, thereby generating cutting line data having first coordinate data to (N+1)-th coordinate data with respect to the pattern C. The control circuit 71 then suffixes delimited data to the cutting line data. The control circuit 71 further adds display data of the cutting line, thus generating cutting data of the patterns B and C.

The control circuit 71 generates coordinate data of apexes B0, B1, B2, . . . and C0, C1, C2, both represented by XY coordinates regarding printing line data of "heart" and "circle" patterns. The control circuit 71 then suffixes delimited data to the printing line data. The control circuit 71 further adds color data of the extracted patterns and display data, thereby generating printing data of patterns B and C. Thus, the control circuit 71 generates processing data of patterns B and C which are effective patterns in the patterns A to C of the object S.

In the case of object S' (see FIG. 13), too, the control circuit 71 extracts, from an image, data of coordinate values of apexes regarding the pattern of "star" which is an effective pattern, although an extracting manner is not shown in detail. The control circuit 71 generates cutting data and printing data of the pattern D based, on the data of coordinate values, whereby processing data of the pattern D is generated. The pattern D is an effective pattern in the "star" pattern D and minute patterns ΔE of the object S'.

The generated processing data is stored by a storage unit such as EEPROM 14 (step S7). Subsequently, the control circuit 71 determines that the read holding member 20 has been currently set (YES at step S3), based on the result of identification by the identification portion 70. As a result, the read holding member 20 is transferred forward by the transfer mechanism 7 thereby to be discharged (step S14). Thus, even when processing is completed (end), the control circuit 71 can read processing data of the pattern D from EEPROM 74 to apply processing of the "star" pattern to an object other than the object S'.

On the other hand, assume that the control circuit 71 determines at step 38 that a holding member 10 which is not for read purpose is set (NO). In this case, the control circuit 71 causes the display 9*a* to display a processing start screen 115 (step S9; see FIG. 14). When a cut key 116 is touched on the processing start screen 115, the control circuit 71 determines whether or not the cartridge 4*c* of the cutter 44 is attached, based on detection signals supplied from the type detection sensors 63A to 63C. When the cartridge 4*c* has been attached and start of processing has been instructed by one or more operation switches of the operation switch device 9*b* (YES at step S10), the control circuit 71 controls to execute a cutting operation based on the generated cutting data of patterns B and C (step S12). Consequently, cutting is executed for the patterns B and C of the object S with the result that the patterns of "heart" and "circle" can be cut out by the cutter 44.

On the other hand, when a draw key 117 is touched on the processing start screen 115, the control circuit 71 determines whether or not the cartridge 4*p* of the pen 45 has been attached and start of processing has been instructed by one or more operation switches of the operation switch device 9*b* (YES at step S11), a printing operation is executed on the basis of printing data of the patterns B and C (step S13). Consequently, printing is executed for the patterns B and C of the object S with the result that the patterns of "heart" and "circle" can be plotted therealong by the pen 45.

Thus, when processing of the patterns B and C of the object S has been completed, the holding member 10 is transferred forward by the transfer mechanism 7 thereby to be discharged (step S14). Thus, processing is completed (end).

As described above, the control circuit 71 executes an image obtaining routine of obtaining an image from the object S or S' to which a pattern is affixed (step S4), a size setting routine of setting the size of invalid pattern to be eliminated from the image obtained by the image obtaining routine (steps S21 to S26), an eliminating routine of eliminating from the image the invalid pattern with the size not exceeding the size set in the sire setting routine (steps S21 and S27) and a processing data generating routine of generating processing data for processing uneliminated effective patterns based on the image from which the invalid pattern has been eliminated by the eliminating routine (step S6).

According to the above-described routines, the size of the invalid pattern to be eliminated from the image of the object S or S' can be set according to the pattern affixed to the object S or S'. This eliminates an invalid pattern having the size not exceeding the set size. Furthermore, processing data of an effective pattern which has not been eliminated is generated by the processing data generating routine. Accordingly, a suitable processing can be executed for the object without processing a part that does not require processing, based on the generated processing data.

The holding member 10 or 20 has a marker which indicates the position where the object S or S' is held. The marker is composed of a pattern having a smaller size than the minimum size settable in the size setting routine (the size setting unit). According to this configuration, even when the pattern of the marker of the holding member 10 or 20 is contained in the image obtained by the image obtaining unit, the pattern of the marker can be eliminated from the image by the eliminating unit irrespective of size set by the size setting unit. This can reliably eliminate the failure that processing data of the marker of the holding member 10 or 20 is generated when processing data of the object S or S' is generated by the processing apparatus 1.

The holding member 10 includes the marker provided on the surface of the base 65 and the adhesive layer 10*v* provided on the surface of the base 65 so as to overlap the marker and removably holding the object S. The adhesive layer 10*v* is formed of the transparent material. According to the holding member 10, the marker of the base 65 is visible through the transparent adhesive layer 10*v*. Consequently, the user can desirably position the object S or S' and affix the object S or S' to the adhesive layer 10*v*.

The holding member 20 includes the marker provided on the surface of the base 68 and the transparent sheet 69 which is disposed on the placement region on the upper surface of the base 68 thereby to cover the object S'. According to the holding member 20, the holding member 20 can hold the object S' easily and reliably so that the object S' is held between the base OS and the transparent sheet 69.

The holding member 20 holding the object S' by the transparent sheet 69 differs from the holding member 10 holding the object S by the adhesive layer 10*v*, in the manner of holding the object. Accordingly, the holding members 10 and 20 can be prevented from erroneous use by the user. Furthermore, the holding member 20 can be repeatedly used for a long period, time, differing from the holding member 10 serving as a consumable item.

The display unit is provided for displaying at least an effective one of the patterns of the object S or S' on the basis of the image obtained by the image obtaining unit and the result of elimination by the elimination unit. According to the display unit, at least the effective pattern can be viewed on the display unit. Furthermore, the user can confirm the result of elimination by the elimination unit and the pattern to be processed.

The processing head 5 is provided with the cutting unit, which cuts the object S. Consequently, the processing apparatus 1 can cut the object S based on the generated processing data.

The processing head 5 is provided with the printing unit which prints the object S. Consequently, the processing apparatus 1 can print the object S based on the generated processing data.

Although the processing apparatus 1 is described in the forgoing example, the disclosure may be directed to various types of apparatuses or devices provided, with the cutting unit and/or the printing unit.

The image obtaining unit should not be limited to the CIS (the scanner 6) but may be configured of a charge coupled drive image sensor (CCD).

Although a data processing program is stored in a storage unit of the processing apparatus 1, the program may be stored in a non-transitory computer-readable storage medium including a USB memory, CD-ROM, flexible disc, DVD and flash memory. In this case, the data processing program stored in the storage medium is read by computers of various types of processing apparatuses provided with a cutting unit and/or a printing unit thereby to be executed. This can achieve the same effect as the above-described example.

The foregoing description and drawings are merely illustrative of the present disclosure and are not to be construed in a limiting sense. Various changes and modifications will become apparent to those of ordinary skill in the art. All such changes and modifications are seen to fail within the scope of the appended claims.

What is claimed is:

1. An apparatus comprising:

a cartridge holder configured to receive a pen or a cutter;

a platen configured to receive an object;

a moving mechanism configured to move the cartridge holder in a direction that the cartridge holder comes close to the platen;

a read unit configured to read image data from the object; and a processor configured to instruct the apparatus to:

set a specific size of a pattern in the image data;

eliminate, from the image data, one or more of specific patterns whose size is less or equal to the specific size of the pattern in the image data; and instruct the moving mechanism to move the cartridge holder close to the platen, based on the image data after eliminating one or more of specific patterns from the read image data.

2. The apparatus according to claim 1, wherein the processor is configured to further instruct the apparatus to:

extract at least one pattern from the image data, the pattern comprising one or more of pixels whose size is less than or equal to a predetermined size, wherein the setting the specific size of a pattern in the image data comprises setting the specific size of the pattern in the extracted at least pattern of pixels.

3. The apparatus according to claim 2, wherein the specific size represents a minimum value that is allowed to set the specific size, and the minimum value is greater than or equal to the predetermined size.

4. The apparatus according to claim 1, wherein the processor further instructs the apparatus to:

generate processing data using an effective pattern, the effective pattern representing the image data after eliminating the one or more of specific patterns from the image data; and instruct the moving mechanism to move the cartridge holder in the direction, based on the processing data.

5. The apparatus according to claim 1, further comprising:

a display, wherein the processor further instructs the apparatus to:

display, in the display, an effective pattern representing the image data after eliminating one or more of specific patterns from the image data.

6. The apparatus according to claim 1, further comprising:

a display; and wherein the processor further instructs the apparatus to:

specify the one or more of specific patterns, after setting the specific size of the pattern in the image data;

display, in the display, the one or more of specific patterns and an effective pattern representing the image data which is eliminated the one or more of specific patterns from the image data; and eliminate, from the image data, the one or more of specific patterns, after displaying the one or more of specific patterns and the effective pattern.

7. A holding member which is configured to be set on the apparatus of claim 1, the holding member comprising:

a base;

a marker provided on a surface side of the base, the marker indicating a position where the object is set, a size of the marker is less than a minimum value that is allowed to set the specific size; and a holding portion provided on a surface of the base, and configured to hold the object.

8. The holding member according to claim 7, wherein the marker represented by a plurality of line segments or dots, and the marker includes at least any one of a base line, a character, a numeral and a symbol whose size are less than the minimum value.

9. The holding member according to claim 7, wherein the holding portion is an adhesive layer disposed on a surface of the base so as to overlap the marker, wherein the adhesive layer is configured to hold the removably, and wherein the adhesive layer is formed by a transparent material.

10. The holding member according to claim 7, wherein the holding portion is a transparent sheet which is disposed on the surface of the base and wherein the transparent sheet is configured to cover the object.

11. A non-transitory computer-readable medium for an apparatus comprising:

a cartridge holder configured to receive a pen or a cutter, a platen configured to receive an object, a moving mechanism configured to move the cartridge holder in a direction that the cartridge holder comes close at least to the platen, a read unit configured to read image data from the object, wherein the computer-readable medium storing computer-readable instructions, when executed by a processor of the apparatus, cause the apparatus to:

set a specific size of a pattern in the image data;

eliminate, from the image data, one or more of specific patterns whose size is less or equal to the specific size of the pattern in the image data; and instruct the moving mechanism to move the cartridge holder close to the platen, based on the image data after eliminating one or more of specific patterns from the read image data.

12. The medium according to claim 11, wherein the computer-readable instructions, when executed by the processor, further cause the apparatus to:

extract at least one pattern from the image data, the pattern comprising one or more of pixels whose size is less than or equal to a predetermined size, wherein the setting the specific size of a pattern in the image data comprises setting the specific size of the pattern in the extracted at least pattern of pixels.

13. The medium according to claim 12, wherein the specific size represents a minimum value that is allowed to set the specific size, and the minimum value is greater than or equal to the predetermined size.

14. The medium according to claim 11, wherein the computer-readable instructions, when executed by the processor, further cause the apparatus to:

generate processing data using an effective pattern, the effective pattern representing the image data after eliminating the one or more of specific patterns from the image data; and instruct the moving mechanism to move the cartridge holder in the direction, based on the processing data.

15. The medium according to claim 11, wherein the apparatus further comprises a display, wherein the computer-readable instructions, when executed by the processor, further cause the apparatus to:

display, in the display, an effective pattern representing the image data after eliminating one or more of specific patterns from the image data.

16. The medium according to claim 11, wherein the apparatus further comprises a display; and wherein the computer-readable instructions, when executed by the processor, further cause the apparatus to:

specify the one or more of specific patterns, after setting the specific size of the pattern in the image data;

display, in the display, the one or more of specific patterns and an effective pattern representing the image data which is eliminated the one or more of specific patterns from the image data; and eliminate, from the image data, the one or more of specific patterns, after displaying the one or more of specific patterns and the effective pattern.

17. An apparatus comprising:

a pen or a cutter;

a platen receiving an object;

a moving mechanism configured to move the pen or the cutter in a direction that the cartridge holder comes close at least to the platen;

a read unit configured to read image data from the object; and a processor configured to instruct the apparatus to:

set a specific size of a pattern in the image data;

eliminate, from the image data, one or more of specific patterns whose size is less or equal to the specific size of the pattern in the image data; and instruct the moving mechanism to move the cartridge holder close to the platen, based on the image data after eliminating one or more of specific patterns from the read image data.

* * * * *